United States Patent
Batchelor et al.

(10) Patent No.: US 12,544,122 B2
(45) Date of Patent: Feb. 10, 2026

(54) BIPOLAR FORCEPS WITH VESSEL SEAL TESTING

(71) Applicant: GYRUS ACMI, INC., Westborough, MA (US)

(72) Inventors: Kester Julian Batchelor, Mound, MN (US); Anh Tri La, St. Louis Park, MN (US); Andreia Chagas Munderloh, Plymouth, MN (US)

(73) Assignee: Gyrus ACMI, Inc., Westborough, MA (US)

( * ) Notice: Subject to any disclaimer, the term of this patent is extended or adjusted under 35 U.S.C. 154(b) by 571 days.

(21) Appl. No.: 17/392,471

(22) Filed: Aug. 3, 2021

(65) Prior Publication Data
US 2022/0039855 A1 Feb. 10, 2022

Related U.S. Application Data

(60) Provisional application No. 63/063,505, filed on Aug. 10, 2020.

(51) Int. Cl.
*A61B 18/12* (2006.01)
*A61B 18/08* (2006.01)
(Continued)

(52) U.S. Cl.
CPC ........ *A61B 18/085* (2013.01); *A61B 18/1206* (2013.01); *A61B 18/1442* (2013.01);
(Continued)

(58) Field of Classification Search
CPC ............ A61B 18/1206; A61B 18/1442; A61B 18/1445; A61B 2018/126; A61B 2018/1455
See application file for complete search history.

(56) References Cited

U.S. PATENT DOCUMENTS 2,031,682 A * 2/1936 Wappler ............. A61B 18/1442
606/51
6,152,923 A * 11/2000 Ryan .................. A61B 18/1445
606/42
(Continued)

FOREIGN PATENT DOCUMENTS

| CN | 114073575 A | 2/2022 |
|---|---|---|
| JP | H08238255 A | 9/1996 |
| JP | 2008539980 A | 11/2008 |

OTHER PUBLICATIONS

"European Application Serial No. 21189396.1, Response filed Jul. 29, 2022 to Extended European Search Report mailed Jan. 12, 2022", 7 pgs.
(Continued)

*Primary Examiner* — Daniel W Fowler
(74) *Attorney, Agent, or Firm* — Schwegman Lundberg & Woessner, P.A.

(57) ABSTRACT

A forceps system for sealing a blood vessel can include a first jaw and an opposing second jaw. At least one of the first and second jaws includes at least a first electrode having first and second electrode portions that are laterally separated to permit electrical isolation between the first and second electrode portions, and the first and second electrode portions are independently addressable to permit individual testing by the first and second electrodes portions of a blood vessel characteristic. This can help permit individual testing of each side of a target seal region of the blood vessel.

16 Claims, 12 Drawing Sheets

(51) Int. Cl.
*A61B 18/14* (2006.01)
*A61B 18/00* (2006.01)

(52) U.S. Cl.
CPC ............ *A61B 2018/00404* (2013.01); *A61B 2018/0063* (2013.01); *A61B 2018/126* (2013.01); *A61B 2018/1455* (2013.01)

(56) References Cited

U.S. PATENT DOCUMENTS

| | | |
|---|---|---|
| 7,862,565 B2 | 1/2011 | Eder et al. |
| 7,942,874 B2 | 5/2011 | Eder et al. |
| 8,696,662 B2 | 4/2014 | Eder et al. |
| 8,728,072 B2 | 5/2014 | Eder et al. |
| 9,339,323 B2 | 5/2016 | Eder et al. |
| 9,867,654 B2 | 1/2018 | Chernov et al. |
| 10,238,385 B2 | 3/2019 | Yates et al. |
| 2005/0113826 A1 | 5/2005 | Johnson et al. |
| 2005/0203507 A1 | 9/2005 | Truckai et al. |
| 2006/0259034 A1* | 11/2006 | Eder ............ A61B 18/1206 606/50 |
| 2006/0259035 A1* | 11/2006 | Nezhat ............ A61B 18/1442 606/50 |
| 2007/0265613 A1 | 11/2007 | Edelstein et al. |
| 2008/0172048 A1* | 7/2008 | Martin ............ A61B 18/1442 601/3 |
| 2009/0248021 A1 | 10/2009 | Mckenna |
| 2010/0036379 A1* | 2/2010 | Prakash ............ A61B 18/18 606/51 |
| 2010/0228250 A1* | 9/2010 | Brogna ............ A61B 18/1445 606/45 |
| 2012/0059375 A1* | 3/2012 | Couture ............ A61B 18/1445 606/51 |
| 2013/0030433 A1 | 1/2013 | Heard |
| 2013/0103035 A1* | 4/2013 | Horner ............ A61B 18/1442 606/51 |
| 2014/0309635 A1* | 10/2014 | Lutze ............ A61B 18/1445 606/51 |
| 2016/0199125 A1* | 7/2016 | Jones ............ A61B 18/1445 606/49 |
| 2016/0287316 A1* | 10/2016 | Worrell ............ A61B 18/1482 |
| 2016/0317216 A1* | 11/2016 | Hermes ............ A61B 18/1206 |
| 2017/0238991 A1 | 8/2017 | Worrell et al. |
| 2018/0360525 A1* | 12/2018 | Batchelor ............ A61B 18/1445 |
| 2019/0200981 A1* | 7/2019 | Harris ............ H04N 7/183 |
| 2019/0336198 A1* | 11/2019 | Viswanathan ..... A61B 18/1233 |
| 2020/0315690 A1* | 10/2020 | Morgan ............ A61B 18/16 |

OTHER PUBLICATIONS

"European Application Serial No. 21189396.1, Extended European Search Report mailed Jan. 12, 2022", 7 pgs.

"European Application Serial No. 21189396.1, Communication Pursuant to Article 94(3) EPC mailed Oct. 23, 2024", 5 pgs.

"Japanese Application Serial No. 2021-129904, Notification of Reasons for Rejection mailed Jan. 28, 2025", W/English Translation, 7 pgs.

"European Application Serial No. 21189396.1, Response filed Feb. 12, 2025 to Communication Pursuant to Article 94(3) EPC mailed Oct. 23, 2024", w claims, 6 pgs.

"Chinese Application Serial No. 202110885527.7, Office Action mailed Jul. 7, 2025", w/ English Translation, 18 pgs.

"Japanese Application Serial No. 2021-129904, Examiners Decision of Final Refusal mailed Jul. 8, 2025", w/ English Translation, 5 pgs.

"Japanese Application Serial No. 2021-129904, Response filed Apr. 28, 2025 to Notification of Reasons for Rejection mailed Jan. 28, 2025", w/ english claims, 9 pgs.

\* cited by examiner

BIPOLAR FORCEPS WITH VESSEL SEAL TESTING

CROSS-REFERENCE TO RELATED APPLICATION

This application claims the benefit of priority to U.S. Provisional Patent Application Ser. No. 63/063,505 filed Aug. 10, 2020, the content of which is incorporated herein by reference in its entirety.

BACKGROUND

Electrosurgery is the application of an electrical signal— an electrotherapeutic signal—to produce a change in biological tissue of a surgical patient in some manner. Various electrosurgical techniques are used to cut, coagulate, desiccate, or fulgurate the biological tissue. These electrosurgical techniques and others can be performed during various medical procedures, such as, for example, laparoscopic surgeries. These medical procedures can include: appendectomy, cholecystectomy, colectomy, cystectomy, gastric banding, gastric bypass, hernia repair, nephrectomy, Nissen fundoplication, prostatectomy, sleeve gastrectomy, and others. Each of these medical procedures can have one or more electrotherapeutic phases, such as, for example, interrogation phase, heating phase, drying phase, cauterizing phase, etc.

The electrotherapeutic signals used in such medical procedures can be generated by an electronics unit and then provided to the biological tissue via an electrosurgical instrument, which can be electrically connected to the electronics unit. The electrosurgical instrument can be configured to mechanically and electrically engage the biological tissue to which the electrotherapeutic signal is provided. Various types of such electrosurgical instruments can be employed, including, for example, various types of forceps, conductive spatulas, electrical pads, etc.

Different medical procedures can implement different electrotherapeutic signals so as to achieve results specific to these different medical procedures. Various electrical metrics of the electrotherapeutic signals provided to the engaged biological tissue can be used to characterize these electrotherapeutic signals. These electrical metrics can include: polarity (monopolar, bipolar), AC and/or DC, frequency, signal amplitude, attack and decay profiles, etc. Electronics units that generate these various electrotherapeutic signals can control one or more of these electrical metrics to provide one or more electrotherapeutic signals that yield efficacious results in the biological tissue engaged by the electrosurgical instrument.

Bipolar forceps can be used to seal and cut tissue such as blood vessels. Bipolar forceps can include jaws that can be used to grasp the tissue of interest, and each jaw can host one or more electrodes. Bipolar forceps can be used to seal (e.g., by coagulation of tissue) a vessel by running an electrical current from the first electrode, through the tissue, and to the second electrode. Bipolar forceps can also include a blade to cut vessels after sealing.

SUMMARY/OVERVIEW

The present disclosure provides a system and method of using a forceps and blade to cut a blood vessel that can individually test the seal on each side of the cut, as opposed to a conventional average measurement of both sides of the cut. At least one forceps jaw can include a lateral split between electrode portions so that current can be individually directed through one side or the other to test a tissue parameter (e.g., impedance, resistance, or phase angle) on that side of the cut to determine seal strength on that side of the cut.

Electrosurgical forceps are often used to seal tissue (such as a vessel) and then cut that sealed tissue into two halves, resulting in two sealed tissue portion. After sealing the tissue, but prior to cutting, the seal can be tested to ensure it is good and will not burst. However, conventional testing techniques rely on electrical parameters of the entire seal, including both sides, as an average electrical parameter representing the seal. Once cut, that seal, broken into two, can potentially include one good seal and one less good seal. In this case, there is a risk of the second seal bursting. The methods and systems discussed herein allow for testing of both sides of a seal independently, and to allow the operator to understand if one or both sides of a seal need to be repaired or redone prior to cutting.

High frequency ("RF") vessel sealing are often used to seal and cut various tissues. Often, seals are created and subsequently cut with HFvessel sealing devices. If the seal is not sufficient, this can result in failures in one side of the sealed vessel, while the other side of the vessel has a strong seal. This can be caused by anomalies in the tissue structure, deposits within the tissue, tissue weaknesses. A seal can tested through electrical feedback from the sealing device to a generator. However, conventional testing methods do not individually test each side of a seal, and instead rely on feedback to the generator regarding a 'complete seal cycle,' failing to individually assess either side of the seal.

Disclosed herein are methods and associated systems for evaluating the two sides of the seal separately, at some point in the sealing or post sealing process, to allow an improved understanding of if there is an issue with one side of the seal or not during sealing and cutting procedures. This can prevent cutting of vessels that are not properly sealed and allow for higher efficiency with less bleeding during electrosurgical procedures using a bipolar forceps.

In an example, a forceps system for sealing a blood vessel can include a forceps including first jaw and an opposing second jaw. At least one of the first and second jaws can include at least a first electrode having first and second electrode portions that are laterally separated to permit electrical isolation between the first and second electrode portions. The first and second electrode portions can be independently addressable to permit individual testing by the first and second electrodes portions of a blood vessel characteristic.

In an example, a method for testing a seal of a vessel can include locating individually addressable first and second electrode portions on opposing sides of the vessel, individually testing a first tissue parameter of a first side of the vessel using the first electrode portion, and individually testing a second tissue parameter of a second side of the vessel using the second electrode portion.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
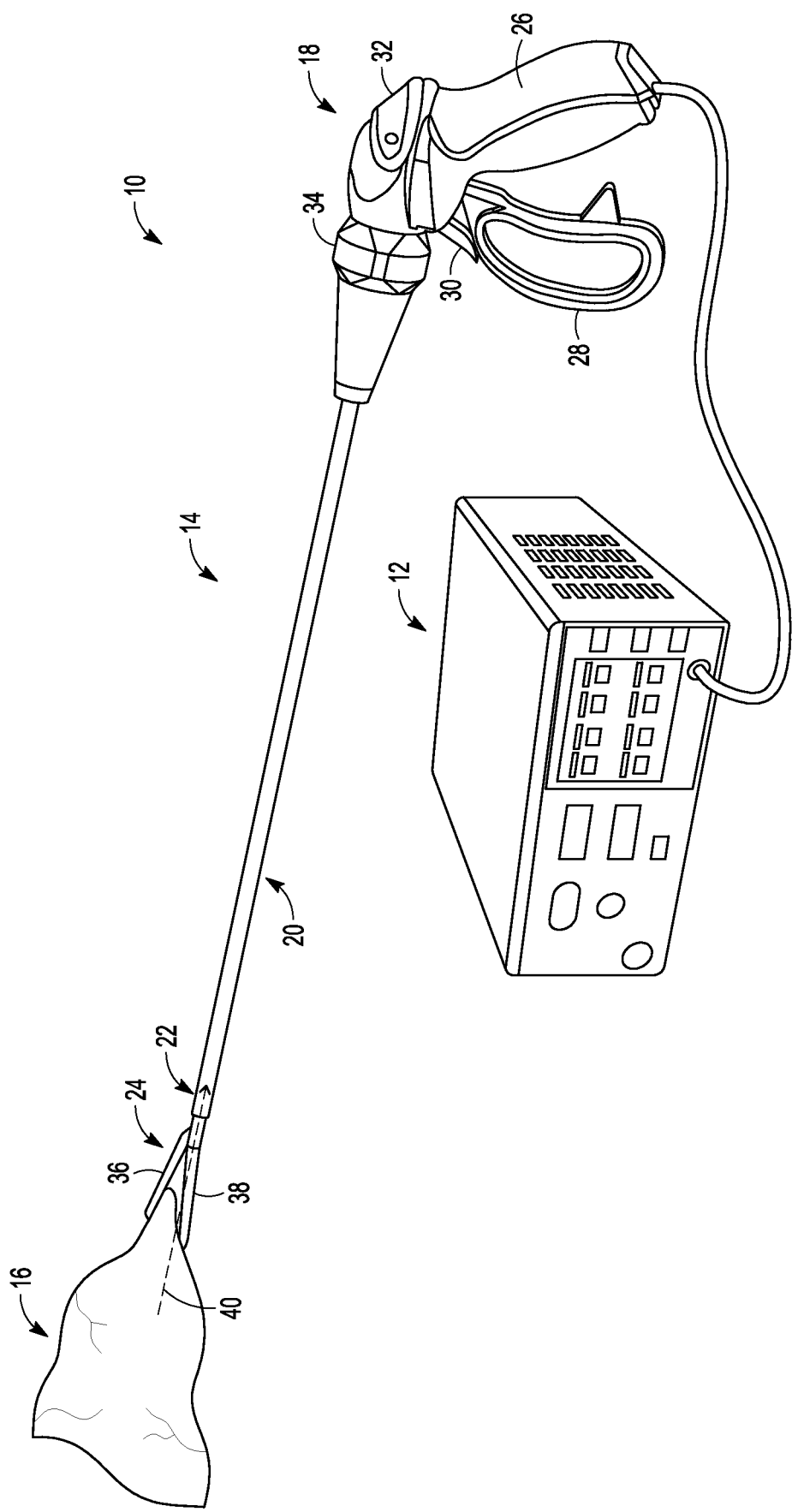
FIG. 1 depicts an electrosurgery system for bipolar vessel sealing including a generator and an instrument having a bipolar electrode in an example.

The present disclosure describes, among other things, an electrosurgery system for blood vessel sealing and cutting, which can help allow for more focused testing of seals with laterally separated and electrically isolated electrodes, such as can be independently addressed to test opposing sides of a target seal region.

Electrosurgically sealing or coagulating biological tissue engaged by an electrosurgical instrument is an electrosurgical technique used in various medical procedures. The engaged biological tissue can be electrosurgically sealed by heating the engaged biological tissue in a controlled manner. In some medical procedures, the biological tissue that is being sealed is a vessel, such as a blood vessel. Heating of the vessel can cause the collagen found in the vessel walls to become denatured. This denatured collagen can form a gel-like substance acting as glue between the vessel walls. When forced together and maintained together while cooling, opposite walls of a vessel can then form a seal.

Heating of the vessel can be carefully controlled so that neither too little nor too much energy is provided to the vessel. If too much energy is provided, then charring and/or burning of the vessel wall can occur. If too little energy is provided, then seal quality of the vessel can be poor. One measure of seal quality is a pressure difference that the sealed vessel can withstand without bursting. Low quality seals can be compromised when the seal meets one or more criteria, such as the applied pressure exceeding a threshold value.

The rate at which the energy is provided to the vessel can also be carefully controlled to facilitate rapid performance of the electrosurgical procedure. Rapid performance of electrosurgical procedures reduces the time and difficulty of these procedures. The rate of heating, however, should not be so rapid as to cause uncontrolled boiling of fluid within the biological tissue. Uncontrolled boiling can rupture engaged or nearby biological tissues and/or compromise the quality of the seal.

Heating of the engaged biological tissue can be controlled by controlling the electrical power of an electrotherapeutic signal provided to and dissipated by the engaged biological tissue. Such electrical power can be controlled according to a sealing energy application schedule. The sealing schedule can be indicative of a product of a voltage difference across and an electrical current conducted by the engaged biological tissue. Thus, the sealing schedule can be provided as an electrical-power schedule.

In bipolar vessel sealing, the resultant seal can be tested from the top jaw to the bottom jaw, such as during or at the last phase of the vessel sealing cycle. This testing can be accomplished by testing the impedance, resistance, phase angle, temperature, power supplied or combination of the above. For example, detection of an increase in the electrical resistance of the engaged biological tissue above a given threshold may indicate that the seal is complete. Such an increase in the electrical resistance in excess of a specified change-in-resistance value can be used as a termination criterion for sealing the vessel, for example, where the specified change-in-resistance value is the difference between the measured resistance (or impedance) and the lowest or other baseline value of the resistance (or impedance) measured in the pulse.

However, the measurement or sensing of electrical parameters, such as resistance or impedance, to test vessel sealing, is in one approach taken as the average across the entire seal from the top jaw to the bottom jaw of the sealing forceps. This approach can lead to an average sense data being taken between two electrodes, representing and conflating information from both sides of the seal. After sealing, the target seal region of the vessel may be cut into two portions, resulting in one seal on each portion. If one side of the seal is good, but the other fails or has low ability to withstand pressure, such a seal can leak or burst during or after the cutting operation. For this reason, individually testing the integrity of both sides of the seal is beneficial, particularly when carried out before the cutting.

FIG. 1 depicts an example of portions of an electrosurgery system 100 for bipolar vessel sealing, such as including a generator and a forceps having a bipolar electrode for cutting, testing, sealing, or otherwise affecting tissue. In FIG. 1, the forceps are depicted as laparoscopic forceps. In other examples, the forceps can be an open forceps or other appropriate type of forceps. In FIG. 1, the electrosurgical system 100 can include an electrosurgical generator and control electronics unit 112 and a forceps 114, which is shown engaging with biological tissue 116. The electronics unit 112 can generate an electrotherapeutic signal, which can be provided to the engaged biological tissue 116 such as via the forceps 114.

The forceps 114 can be an electrosurgical forceps such as a bipolar forceps. The forceps 114, can be used for medically related procedures, such as open and/or laparoscopic medical procedures such as to manipulate, engage, grasp, cut, cauterize, seal, or otherwise affect a vessel, biological tissue, vein, artery, or other anatomical feature or object.

The forceps 114 can include a hand piece 118, a shaft assembly 120, a knife blade assembly 122, and a gripping assembly 124. The forceps 114 can be electrically connected to the electronics unit 112, which can generate the electrotherapeutic signal and provide the generated electrotherapeutic signal to the forceps 114. The forceps 114 can then electrically communicate the electrotherapeutic signal to the gripping assembly 124, which can be employed for various electrosurgical techniques, such as cauterizing, sealing, or other such electrosurgical techniques.

The hand piece 118 can include a handle 125, a gripping lever 128, a knife trigger 130, an electrical therapy actuation button 132, and a rotation wheel 134. The gripping assembly 124 can include a first jaw member 136 and a second jaw member 138. The shaft assembly 120 is connected at a proximal end to the hand piece 118, and at a distal end to the gripping assembly 124. The shaft assembly 120 can extend distally from the hand piece 118 in longitudinal direction 140 to the gripping assembly 124.

The shaft assembly 120 can function to permit a portion of the forceps 114 (e.g., the gripping assembly 124 and a distal portion of the shaft assembly 120) to be inserted into a patient or other anatomy while a remaining portion of the forceps 114 (e.g., the hand piece 118 and a remaining proximal portion of the shaft assembly 120) are outside of the patient or other anatomy. The shaft assembly 120 can include one or more angles, bends, and/or arcs. The shaft assembly 120 can be a cylinder with a circular, elliptical, or other cross-sectional profile, or other elongated member that extends from hand piece 118 to the gripping assembly 124. The shaft can be bendable, steerable or otherwise deflectable.

In some examples, the shaft assembly 20 can include an elongated hollow member (e.g., a tubular outer shaft) such as can enclose the knife blade assembly 122 and a mechanical linkage to couple the knife blade assembly 122 with the knife trigger 130. In general, the shaft assembly can be any elongated member having stiffness sufficient to transfer forces along the longitudinal direction 140. The shaft assembly 120 also can include one or more electrically conductive elements (e.g., wires, a conductive outer shaft and/or a conductive inner shaft, etc.) such as to provide electrical communication between the hand piece 118 and the gripping assembly 124, such as to communicate an electrotherapeutic signal thereby.

The gripping lever 128, the knife trigger 130, the electrical therapy actuation button 132, and the rotation wheel 134 of the hand piece 118, each can be configured to cause various actuations, such as at or near the distal end, of the shaft assembly 120. For example, actuation of the gripping lever 128 can be configured to control operation of the gripping assembly 124 at the distal end of the shaft assembly 120. The gripping lever 128 can include a gripping actuator that is movable between an open configuration position (illustrated in FIG. 1) and a closed configuration position in which the gripping lever 128 is moved proximally toward the handle 126. Movement of the gripping lever 128 proximally toward the handle 126 to the closed configuration position causes the gripping assembly 124 to transition from the open configuration to the closed configuration. Movement of the gripping lever 128 distally (e.g., release of gripping lever 128) to the open configuration position can cause the gripping assembly 124 to transition from the closed configuration to the open configuration.

Such transitions between the open and closed configurations of the gripping assembly 124 can be provided by one or more of first and second jaw members 136 and 138 moving between an open configuration (illustrated in FIG. 1), in which the first and second jaw members 136 and 138 are spaced apart, and a closed configuration, in which the gap between the first and the second jaw members 136 and 138 is reduced or eliminated. In the electrosurgical system 100, the first and second jaw members 136 and 138 are opposable to one another and can be configured to clamp the biological tissue 116 therebetween, such as in a manner that permits electrical communication between opposable the jaw members 136 and 138 via clamped biological tissue 116 such as for testing, cutting, sealing, or other diagnosis or treatment of the biological tissue 116.

A mechanical linkage within the shaft assembly 120 can be configured to cause one or more of the first and second jaw members 136 and 138 to move between the open configuration and the closed configuration, such as in response to actuation of the gripping lever 128.

Actuation of the knife trigger 130 can be configured to control operation of the knife blade assembly 122 located at the distal end of the shaft assembly 120. The knife blade assembly 122 can be configured to cut, excise, or otherwise affect biological tissue or other object(s) clamped between the first and second jaw members 136 and 138. The knife trigger 130 can include a knife blade actuator that is movable between a retracted configuration position of the cutting blade and a deployed or extended configuration position of the cutting blade in which the knife trigger 130 is moved proximally toward the handle 126 to cause the knife blade assembly 122 to cut biological tissue 116, which is clamped between the first and second jaw members 136 and 138. The movement of the knife trigger 130 proximally toward the handle 126 to the deployed configuration position can cause a cutting blade of the knife blade assembly 122 to engage the biological tissue 116, thereby cutting the biological tissue 116. The movement of the knife trigger 130 distally can cause the cutting blade to retract from clamped biological tissue 116.

The rotation wheel 134 can be configured to control rotational configuration of one or more of the knife blade assembly 122, and the gripping assembly 124 at the distal end of the shaft assembly 120 and/or control rotational configuration of the shaft assembly 120. Movement of the rotation wheel 134 can cause rotation of one or more of the shaft assembly 120, the knife blade assembly 122, and the gripping assembly 124 about an axis extending in the longitudinal direction 140. Such rotational control can facilitate alignment of the gripping assembly and/or the knife blade assembly with the clamped biological tissue 116.

The therapy actuation button 132 can be configured to control generation and/or delivery of the electrotherapeutic signal to engaged biological tissue 116. Actuation of the therapy actuation button 132 can cause an electrotherapeutic signal, drawn from e.g., the electronics unit 112, to be applied to one or more of the first and second jaw members 136 and 138, a remote pad (not illustrated), or other portions of the forceps 114 to cauterize, seal, or otherwise electrically affect a patient or other anatomy.

Figure 2:
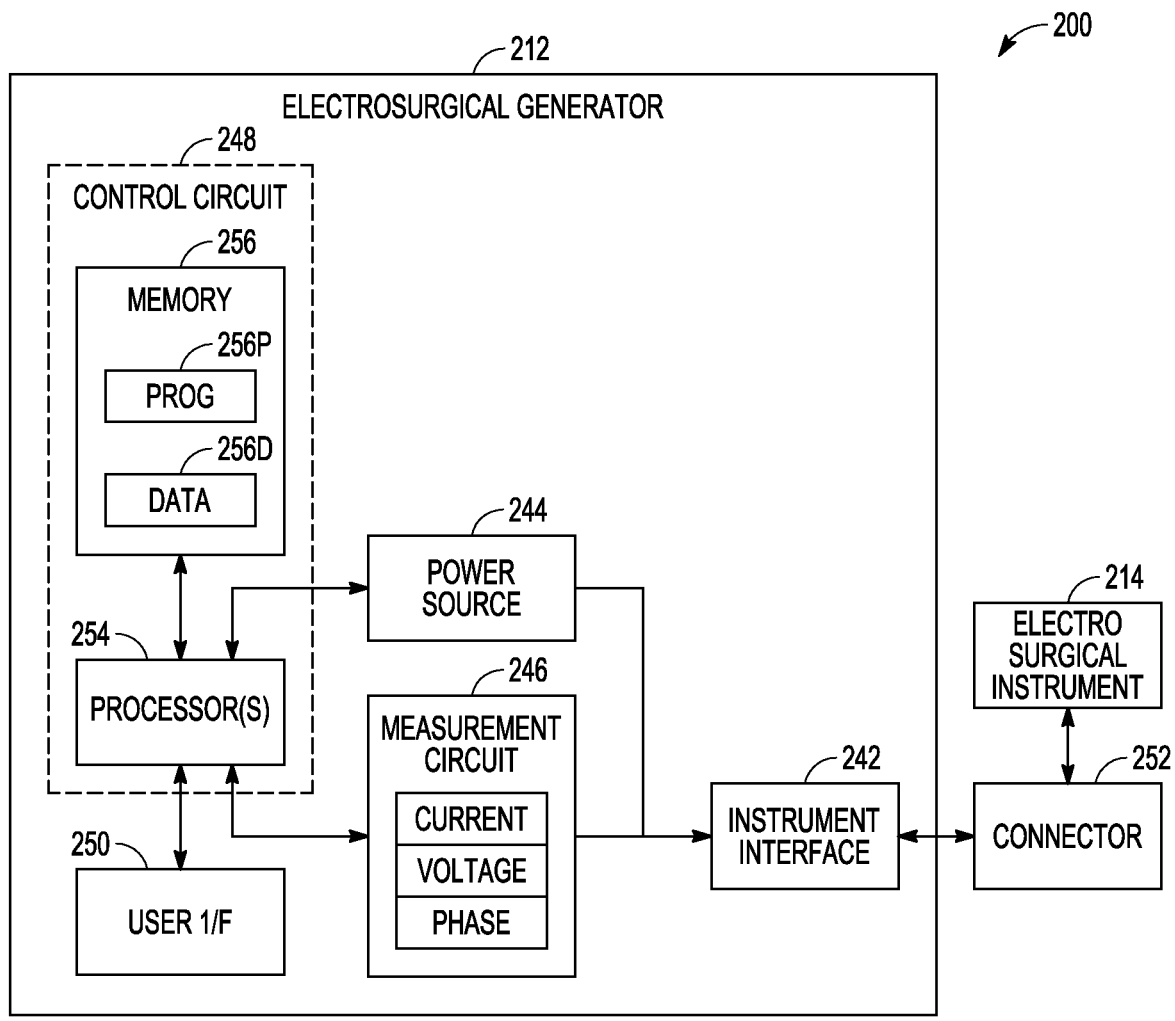
FIG. 2 depicts a control unit for an electrosurgery system.

FIG. 2 depicts a block diagram of an electrosurgical system 200 that can include an electronics unit 212 and a forceps 214, such as those discussed with reference to FIG. 1 above. The electronics unit 212 can be configured to generate the electrotherapeutic signal, such as a high frequency ("HF") electrical signal, that the forceps 214 delivers to engaged biological tissue 216.

The electronics unit 212 can include an instrument interface 242, an electrical-energy source 244, a measurement circuit 246, a control circuit 248, and a user interface 250. The instrument interface 242 can include signal drivers, buffers, amplifiers, ESD protection devices, and electrical connector 252, among other components. The electrical connector 252 can be configured to electrically couple the forceps 214 to the electronics unit 212 so as to provide electrical communication between the electronics unit 212 and the forceps 214. Such electrical communication can be used to transmit operating power and electrical signals therebetween. The forceps 214, in turn, can provide electrical communication between the electrical connector 252 and biological tissue engaged thereby.

The electrical-energy source 244 can be configured to generate an electrotherapeutic signal to be delivered to the engaged biological tissue via electrically connected forceps 214. The generated electrotherapeutic signal can be controlled so as to obtain the desired result for a specific electrosurgical procedure. For example, the electrotherapeutic signal can be configured to resistively heat the engaged biological tissue so as to surgically affect, such as seal, the engaged biological tissue.

The measurement circuit 246 can be configured to measure one or more electrical parameters of biological tissue engaged by connected forceps 214. The measurement circuit 246 can be in electrical communication with the connected forceps 214 when the electronics unit 212 is electrically connected to the forceps 214 via the electrical connector 252. Various examples of the measurement circuit 246 can be configured to measure one or more of various electrical parameters. For example, the measurement circuit 246 can be configured to measure voltage difference across and electrical current conducted by the engaged biological tissue 216. In some examples, the measurement circuit 246 can be configured to measure phase angle between voltage difference delivered across and electrical current conducted by the engaged biological tissue. In some examples, the measurement circuit 246 can be configured to measure one or more DC and/or AC electrical parameters of the engaged biological tissue.

The one or more measured parameters can be used to determine one or more other metrics. For example, measurements of voltage difference delivered across, electrical current conducted by the engaged biological tissue, or phase angle therebetween, can be used to determine electrical resistance, complex impedance, or also can be used to determine apparent power (VA) or real power (W) provide to the engaged biological tissue. Such measurements of electrical parameters can be used for controlling delivery of an electrotherapeutic signal to an engaged biological tissue.

The control circuit 248 can be electrically connected to and configured to control operation of the electrical-energy source 244 and the measurement circuit 246. The control circuit 248 can cause the electrical-energy source 244 to provide an electrotherapeutic signal to biological tissue engaged by the electrically connected forceps 114. The control circuit 248 can cause the electrical-energy source 244 to generate an electrotherapeutic signal, according to an electrotherapeutic schedule, such that the generated electrotherapeutic signal is controlled for a specific electrosurgical procedure. Such electrotherapeutic schedules can be used to effectuate various types of electrotherapy. In some examples, real power (W), voltage difference (V), electrical current (A), or apparent power (VA), of the electrotherapeutic signal provided to the engaged biological tissue can be controlled according to an electrical-power schedule.

The control circuit 248 can cause the electrical-energy source 244 to provide energy to engaged biological tissue, such that a product of a voltage difference across and an electrical current conducted by the engaged biological tissue is controlled according to the electrotherapeutic schedule. The control circuit 248 can use the comparison of the determined real power with an electrotherapeutic schedule to generate an error signal or other indicator signal used to provide information to the user or other machine. Such an indicator signal can be used in a closed-loop feedback system that includes electrical-energy source 44, so as to generate the electrotherapeutic signal according to the electrotherapeutic schedule.

The control circuit 248 can include a processor 254 and a memory 256. The control circuit 248 can include a timer or clock. The processor 254 can be configured to implement functionality or process instructions for execution within the electrosurgical system 100, such as instructions stored in the program memory 156P. The processor 154 can execute the program instructions to cause the electrical-energy source 244 to generate the electrotherapeutic signal according to a specified electrotherapeutic schedule. The specified electrotherapeutic schedule can be retrieved from data memory 256D, for example. The processor 254 can compare one or more electrical parameters measured by the measurement circuit 246 with the retrieved specified electrotherapeutic schedule. The processor 254 can send one or more commands to the electrical-energy source 244 and/or the measurement circuit 246. The processor 254 also can also send or receive information from the user interface 250.

FIG. 2 depicts an example of a schematic diagram of portions of an electronics unit. In various examples, electronics unit 112 of FIG. 1 can be provided using the various elements of FIG. 2, or other various elements. For example, the processor 254 can include any one or more of a microprocessor, a control circuit, a digital signal processor (DSP), an application specific integrated circuit (ASIC), a field-programmable gate array (FPGA), or other equivalent discrete or integrated logic circuitry.

The memory 256 can be configured to store information within electrosurgical system 210 during operation. The memory 256, in some examples, is described as computer-readable storage media. In some examples, a computer-readable storage media can include a non-transitory medium. The term "non-transitory" can indicate that the storage medium is not embodied in a carrier wave or a propagated signal. In some examples, a non-transitory storage medium can store data that can, over time, change (e.g., in RAM or cache). In some examples, the memory 256 is a temporary memory, meaning that a primary purpose of the memory 256 is not long-term storage. The memory 256, in some examples, is described as volatile memory, meaning that the memory 256 does not maintain stored contents when power to electrosurgical system 200 is turned off. Examples of volatile memories can include random access memories (RAM), dynamic random-access memories (DRAM), static random-access memories (SRAM), and other forms of volatile memories. In some examples, the memory 256 is used to store program instructions for execution by the processor 254. The memory 256, in an example, is used by software or applications running on the electrosurgical system 200 (e.g., a software program implementing electrical control of an electrotherapeutic signal provide to biological tissue engaged by an electrosurgical instrument) to temporarily store information during program execution, such as, for example, in the data memory 256D.

The memory 256 can also include one or more computer-readable storage media. The memory 256 can be configured to store larger amounts of information than volatile memory. The memory 256 can further be configured for long-term storage of information. In some examples, the memory 256 includes non-volatile storage elements. Examples of such non-volatile storage elements can include magnetic hard discs, optical discs, flash memories, or forms of electrically programmable memories (EPROM) or electrically erasable and programmable (EEPROM) memories.

The user interface 250 can be used to communicate information between the electrosurgical system 200 and a user (e.g., a surgeon or technician). The user interface 250 can include a communications module. The user interface 250 can include various user input and output devices. For example, the user interface can include various displays, audible signal generators, as well switches, buttons, touch screens, mice, keyboards, etc.

The user interface 250, in an example, can utilize the communications module to communicate with external devices via one or more networks, such as one or more wireless or wired networks or both. The communications module can include a network interface card, such as an Ethernet card, an optical transceiver, a high frequency transceiver, or any other type of device that can send and receive information. Other examples of such network interfaces can include Bluetooth, 3G, 4G, and Wi-Fi radio computing devices as well as Universal Serial Bus (USB) devices.

Figure 3A:
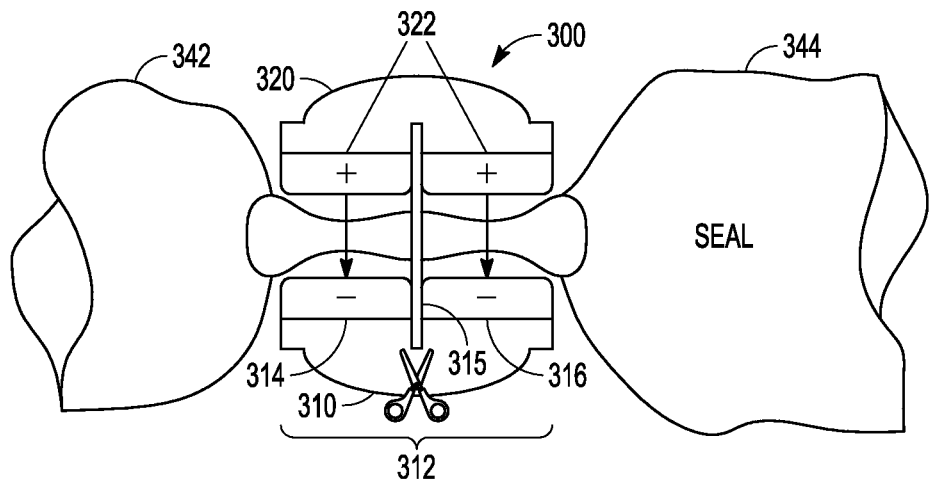
FIGS. 3A-3C illustrate schematic diagrams of a bipolar electrode in an example.
Figure 3B:
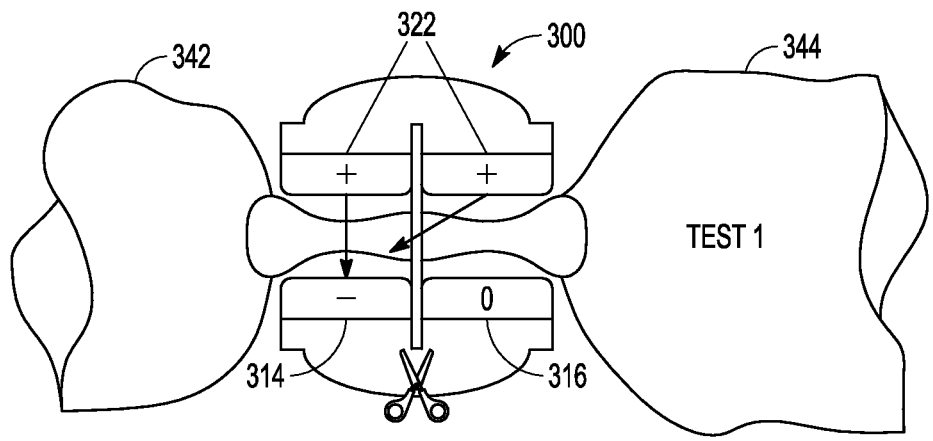
Figure 3C:
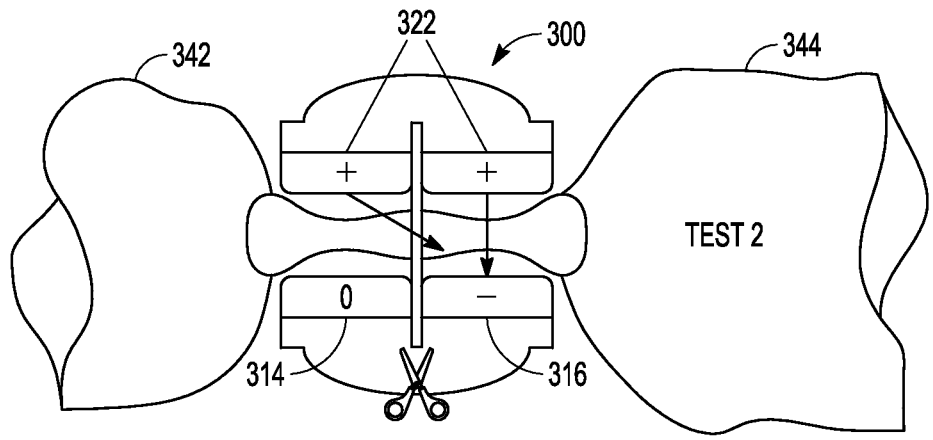

FIGS. 3A-3C illustrate examples of schematic diagrams of a forceps 300 such as can be configured for cutting and sealing a bipolar tissue cut. The forceps 300 can include a first jaw 310 with a first electrode 312, such as can include individually addressable first portion 314, and second portion 316. The forceps 300 can also include a second jaw 320 with a second electrode 322. A portion of a blade slot 315 can be located on first jaw 310, such as between the first portion 314 and the second portion 316 of the first electrode 312.

The first jaw 310 and the second jaw 320 can be opposite arms on the forceps 300, and can be shaped, sized, or formed to allow clamping or treatment of a vessel or other tissue therebetween. The forceps jaws 310, 320, can be connected at a proximal portion by a hinge or other pivot feature such as that can allow opening and closing of the jaws such as during operation of the forceps 300, such as discussed with reference to FIG. 1. A distal portion of the forceps 300 can host the first and second electrodes 312, 322. The first jaw 310 can provide at least a portion of the blade slot 315. The forceps 300 can be moved between an open position, in which the distal portions of the first jaw 310 and the second jaw 320 are spaced apart, and a closed position in which the first jaw 310 and the second jaw 320 are close together.

An optional blade slot 315 can extend longitudinally along at least a portion of the first jaw 310. The blade slot 315 can be shaped or sized to receive a blade that can be extended into the slot to allow for cutting.

The first electrode 312 and the second electrode 322 can be used as electrotherapy electrodes, such as to apply high frequency (RF) or other electrotherapeutic energy for sealing tissue. The first electrode 312 and second electrode 322 can be in electrical communication with an electronics unit 112, which can provide electrical current to a target tissue site for treatment. The first electrode 312 can be situated on the first jaw 310 of the forceps 300, and the second electrode 322 can be situated on the second jaw 320 of the forceps 300.

The first electrode 312 and the second electrode 322 can be shaped as plates, respectively extending along a surface of the first jaw 310 and the second jaw 320, or other shapes or sizes as desired, such as described below with reference to FIGS. 5-11. The first electrode 312 and the second electrode 322 can be of similar shape and size, or of differing shapes and sizes. In some cases, each of the first electrode 312 and second electrode 322 can include multiple portions such as can be addressed individually or in groups to act as multiple electrodes.

The first portion 314 and the second portion 316 of the first electrode 312 can be independently addressable such that they are electrically isolatable from each other, and able of being separately actuated for sensing, sealing or other activation purposes. The first portion 314 and the second portion 316 can be individually or separately connected to the electrosurgical generator and control electronics unit 112, such that each portion 314, 316, can be separately actuated. The connections between the portions 314, 316 and the unit 112 can be done, for example, with separate conductors in the forceps 300, running to each portion 314, 316, separate from the other. Such separate conductors can be electrically isolated so that they can be in electrical communication with only one of the portions 314, 316. In an example, the separate conductors can extend back through the jaw of the forceps to a switching matrix in the handle. In an example, switching circuitry can be on board the forceps 300 towards the distal portion to allow independently addressing of at least two electrode portions.

For example, the first electrode 312 can be split into two or more electrically isolatable portions, such as first portion 314 and second portion 316, such as to allow for testing of two sides of a target seal region created with the forceps 300. This can help permit the two sides of the target seal region to be independently interrogated, such as to test these different sides of the target seal region for sealing adequacy, such as before then cutting tissue in between these two different sides of the target seal region. In some cases, two sides of an intended cut zone, or two sides of a blade slot, can be tested as well as the target seal region. For example, the first portion 314 and the second portion 316 of the first electrode 312 can be laterally separated, such as by a channel, zone or the blade slot 315. This can allow positioning of the first portion 314 on a first side of a target seal region and positioning of the second portion 316 on a laterally opposing side of the target seal region, so that corresponding locations can be independently tested for a seal characteristic before then cutting tissue therebetween. In forceps 300, the second electrode 322 can include one electrode without multiple portions, or the second electrode 322 can include multiple portions, such as corresponding to respective portions of the first electrode 312 such as shown and described with reference to FIGS. 4A-4B below.

FIG. 3A depicts a sealing step, in which a target seal region of a vessel, such as a blood vessel, can be sealed using the forceps 300. In FIG. 3A, the forceps 300 can clamp a piece of target tissue 330 (such as a blood vessel) between the first jaw 310 and the second jaw 320.

During the sealing phase, the first electrode 312 and the second electrode 322 can be set to different polarities. The electrical energy from the sealing signal or pulse can be run between the sides of the jaw, through the tissue, between the first electrode 312 and the second electrode 322 in an alternating fashion, causing coagulation of tissue between the jaw. This can create a target seal region 340 of the target tissue between the jaw. The target seal region 340 can have a first side 342 and a second side 344. The tissue can be sealed, dried or otherwise prepared, such as described in U.S. Patent Appln. No. 62/845,647, the entirety of which is incorporated by reference herein, including its description of calibration and preparation.

One or more electrical parameters of the sealing signal or pulse, such as resistance, impedance, or phase angle, can be monitored during or after the sealing phase. If an individual monitored electrical parameter or a derived composite indication meets one or more criteria (e.g., a given electrical parameter reaches a given threshold value), then the system can indicate that the sealing phase is complete and the end point of the desired sealing has been reached. This can be communicated to the operator through an indication such as a user interface, light, sound, haptic indication, or other appropriate signal.

In FIGS. 3B and 3C, independent testing of each lateral side of the target seal region 340 made in FIG. 3A can be performed. First, as shown in FIG. 3B, the first side 342 of the target seal region 340 is tested. Next, in FIG. 3C, the second side 344 of the target seal region 340 is tested. For testing purposes, the first jaw 310 can include the first electrode 312 itself, or a portion thereof 314, 316, such as can act an electrical signal, such as for detecting an electrical signal that can be communicated to sensor interface circuitry for measuring electrical conductivity, resistivity, impedance, phase angle, reactance, resistance, capacitance, inductance, or one or more combinations thereof, of the tissue in the target seal region 340 of the surgery environment. In some cases, the electrical signal can include one or more of the first electrode portion 314, the second electrode portion 316, or the second electrode 322, in combination with each other or with one or more other electrodes sensor electrodes that can be coupled to sensor interface circuitry.

For example, the selected electrodes or electrode portions can be used to detect an electrical signal, from which sensor interface circuitry can process and extract an indication of the real-valued or complex-valued electrical impedance or electrical conductance of the target tissue (e.g., electrical conductivity, electrical resistivity, electrical impedance, electrical conductance, phase angle, reactance, resistance, capacitance, inductance, or the like). The level of coagulation of a seal can affect these electrical signal and properties.

In some cases, the electrical signal interface circuitry can provide an impedance sensor, such as can use the electrosurgical signal or a separate electrical test signal to deliver a specified current or voltage to the tissue, which can measure a responsive voltage or current indicative of tissue impedance, such as when the series impedance of the leads or electrodes are subtracted. A three-point or four-point probe or similar impedance sensing electrode arrangement can be used, such as to permit sensing of the response variable via a high input impedance sensing interface amplifier separate from the effects of the larger test or electrosurgical signal passing through the impedance of the leads connected to electrodes used for delivering such signals. For example, such a three-point or four-point probe can use bipolar electrodes for delivering the test or electrosurgical signal and can include one or more additional electrodes for sensing the response variable into the high input impedance sensing interface amplifier. Thus, the impedance sensor can include using the first electrode 312, additional, or separate impedance sensing electrodes Impedance information can also include phase angle information, such as can describe the phase relationship between current and voltage in an AC circuit, such as in a high frequency AC electrosurgery application. The phase angle can describe the phase difference between the voltage applied to the tissue impedance and the current driven through it. Because tissue impedance can include reactive components such as capacitance or inductance, the resulting current will either lag behind the applied voltage (e.g., phase shift due to inductive components) or lead the applied voltage (e.g., phase shift due to capacitive components). Phase angle can be determined, for example, between current and voltage at a given time by comparing the times corresponding to detected edges or other reference or threshold values of current and voltage.

Phase angle signal-processing circuitry can accomplish this comparison such as applying a technique such as a Discrete Fourier Transform (DFT). For example, samples of a signal being analyzed can be correlated point-by-point, such as with each of both a sine function and a cosine function. Arbitrarily, the cosine part can be called real, and the sine part can be called imaginary. If the signal being analyzed has no phase shift, the result of the DFT is 100% real. If the signal being analyzed has a 90-degree phase shift, the result of the DFT is 100% imaginary. If the result of the DFT has both a real and imaginary component, the phase angle can be calculated as the arctangent of a ratio of the imaginary and real values.

One or more electrical properties of the target tissue, such as conductivity, resistivity, impedance, or phase angle, can be sensed throughout a testing phase of electrosurgery, or during one or more "sensing pulses," such as can be sent out intermittently during the testing phase of electrosurgery.

For example, in FIG. 3B, the first portion 314 of the first electrode 312 can be set to a polarity opposite the second electrode 322. The second portion 316 of the first electrode 312, which is capable of being electrically isolated from and independently actuated from the first portion 314, can be either grounded or configured to operate a floating output while the first portion 314 of the first electrode 312 and the second electrode 322 are being used to test a tissue characteristic toward a side of the target seal region 340 that is closest to the first portion 314 of the first electrode 312. In this case, current is run from the second electrode 322, through the first side 342 of the target seal region 340 to the first portion 314 of the first electrode 312, excluding the second portion 316 of the first electrode 312. Thus, the first portion 314 of the first electrode 312 can act as a localized tissue characteristic sensor, providing an electrical signal from which sensor interface circuitry can detect one or more of impedance, resistance, or other electrical parameter of the current or power indicating a localized quality of the seal formed at that portion of the target seal region 340. The control circuit 148 can compare that parameter to one or more criteria, such as to a threshold value, such as to indicate whether the strength of the sealing on the first side 342 of the target seal region 340 meets the one or more criteria to be deemed sufficient.

After the first side of the target seal region 340 is tested, the second side 344 of the target seal region 340 can be tested, such as shown in FIG. 3C. Here, the second portion 316 of the first electrode 312 can be set to a polarity opposite that of the second electrode 322. The first portion 314 of the first electrode 312, which is capable of being electrically isolated from and independently actuated from the second portion 316, can be either grounded or configured to operate as a floating output while the second portion 316 of the first electrode 312 and the second electrode 322 are being used to test a tissue characteristic toward a side of the target seal region 340 that is closest to the second portion 316 of the first electrode 312. In this case, current can be run from the second electrode 322, through the second side 344 of the target seal region 340 to the second portion 316 of the first electrode 312, excluding the first portion 314 of the first electrode 312. Thus, the second portion 316 of the first electrode 312 can act as a localized tissue characteristic sensors, such as providing an electrical signal from which the sensor interface circuitry can detect one or more of impedance, resistance, or other electrical parameter of the current or power coming across the localized tissue. The control circuit 148 can compare that parameter to one or more criteria, such as a threshold value, such as to determine whether the strength of the seal at the second side 344 of the target seal region 340 can be deemed sufficient.

This evaluation of sensed data can occur during the sealing process, or after the attempted seal has been completed, such as in a separate post-sealing energy application testing phase. In some cases, independent testing of the seal quality at each side of the target seal region 340 can occur before cutting the vessel at a location that is between these two independently-verified seal locations. The integrity of the individual sides of the seal can be determined by a control circuit and indicated to the operator, such as a surgeon, of the forceps 300. If the seal integrity is found to be unacceptable on one or more sides of the seal, the system can indicate to the operator a warning to not proceed with cutting, can attempt to re-seal and test again, or can stop or otherwise inhibit or disable the cutting. For example, one or both sides of the target seal region 340 can be additionally treated with further electrotherapeutic energy to promote additional sealing. Examples of processes of determining whether additional sealing energy is needed are discussed below in reference to FIGS. 12-18.

Figure 4A:
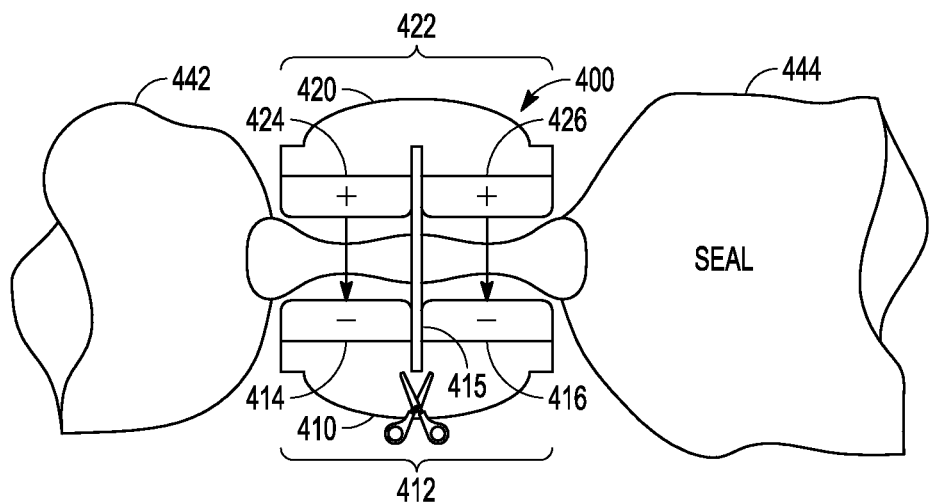
FIGS. 4A-4C illustrate schematic diagrams of a bipolar electrode in an example.
Figure 4B:
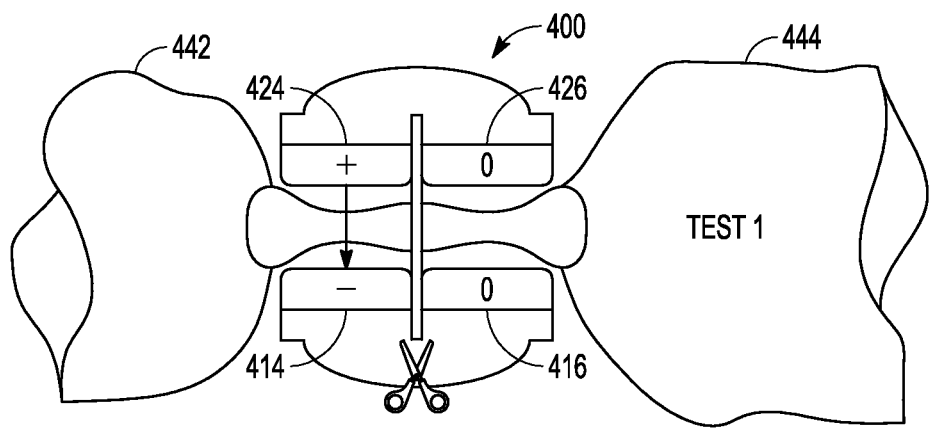
Figure 4C:
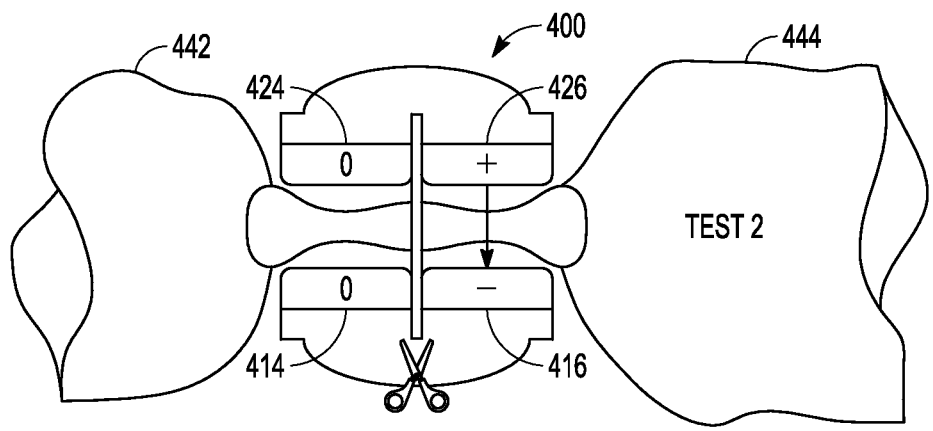

FIGS. 4A-4C illustrate examples of schematic diagrams of portions of a forceps 400 configured for cutting and sealing a bipolar tissue cut. The forceps 400 can include a first jaw 410 with a first electrode 412, such as can include individually addressable first portion 414, and second portion 416. The forceps 400 can also include a second jaw 420 with a second pelectrode 422, such as can include individually addressable third portion 424, and fourth portion 426. A portion of a blade slot 415 can be situated on the first jaw 410, such as between the first portion 414 and the second portion 416 of the first electrode 412. A portion of a second blade slot 425 can be situated on the second jaw 420, such as between the third portion 424 and the fourth portion 426. The forceps 400 can function similarly, and contain similar components to, forceps 300 discussed above, except where otherwise noted.

The first electrode 412 and the second electrode 422 can be shape as plates, respectively extending along a surface of the first jaw 410 and the second jaw 420, or other shapes or sizes as desired, such as described below with reference to FIGS. 5-11. The first electrode 412 and the second electrode 422 can be of similar shape and size, or of differing shapes and sizes. In some cases, each of the first electrode 412 and the second electrode 422 can include multiple portions such as can be addressed individually or in groups to act as multiple electrodes.

For example, in forceps 400, the second electrode 422 can be split into two or more electrically isolatable portions, such as third portion 424 and fourth portion 426 to allow for testing of two sides of a target seal region created with the forceps 400. This can help permit the two sides of the target seal region to be independently interrogated and sealed, such as to test these different sides of the target seal region for sealing adequacy, such as before then cutting tissue in between these two different sides of the target seal region. For example, the third portion 424 and the fourth portion 426 of the second electrode 422 can be laterally separated, such as by a channel, zone or the blade slot 425. This can allow positioning of the third portion 424 on a first side of a target seal region and positioning of the fourth portion 426 on a laterally opposing side of the target seal region (or laterally opposing sides of the blade slot), so that corresponding locations can be independently tested for a seal characteristic before then cutting tissue therebetween. The second electrode 422 of forceps 400, having individually addressable third portion 424 and fourth portion 426 can allow for more directed testing and sealing of target portions of a vessel compared to the second electrode 322 of forceps 300 without those individually addressable portions. The forceps 400 of FIGS. 4A-4C can include additional wiring compared to the forceps 300 above, as each electrode portion can be electrically connected.

FIG. 4A depicts a sealing step, in which a target seal region of a vessel, such as a blood vessel, can be sealed using the forceps 400. In FIG. 4A, the forceps 400 can clamp a piece of target tissue 430 (such as a blood vessel) between the first jaw 410 and the second jaw 420. During the sealing phase, the first electrode 412 and the second electrode 422 can be set to different polarities. The electrical energy from the sealing signal or pulse can be run between the sides of the jaw, through the tissue, from the first electrode 412 to the second electrode 422, causing coagulation of tissue between the jaw. This can create a target seal region 440 of the target tissue between the jaw. The target seal region 440 can have a first side 442 and a second side 444. Before such sealing, the system can be calibrated The sealing step can occur similar to the method described with reference to FIG. 3A above. In FIGS. 4B and 4C, independent testing of each lateral side of the target seal region 440 made in FIG. 4A can be performed. First, as shown in FIG. 4B, the first side 442 of the target seal region 440 is tested. Next, in FIG. 4C, the second side 444 of the target seal region 440 is tested. For testing purposes, the first electrode 412 itself, or a portion thereof 414, 416, or the second electrode 422 itself, or a portion thereof 424, 426, such as can act an electrical signal sensor, such as for detecting an electrical signal that can be communicated to sensor interface circuitry for measuring electrical conductivity, resistivity, impedance, phase angle, reactance, resistance, capacitance, inductance, or one or more combinations thereof, of the tissue in the target seal region 440 of the surgery environment. In some cases, the electrical signal sensor can include one or more of the first electrode 412, portions thereof 414, 416, the second electrode 422, portions thereof 424, 426, in combination with each other or with one or more additional sensor electrodes that can be coupled to sensor interface circuitry.

For example, in FIG. 4B, the first portion 414 of the first electrode 412 can be set to a polarity opposite the third portion 424 of the second electrode 422. The second portion 416 of the first electrode 412, and the fourth portion 426 of the second electrode 422 can either be grounded or configured to operate as floating outputs while the first portion 414 and the third portion 424 are being used to test a tissue characteristic towards a side of the target seal region 440 that is closest electrode portions 414, 424. In this case, current can be run from the first portion 424 of the second electrode 422, through the first side 442 of the target seal region 440 to the first portion 414 of the first electrode 412, excluding the second portion 316 of the first electrode 412 and the fourth portion 426 of the second electrode 422. Thus, the first portion 414 of the first electrode 412 can act as a localized tissue characteristic sensor, providing an electrical signal from which sensor interface circuitry can detect one or more of impedance, resistance, or other electrical parameter of the current or power indicating a localized quality of the seal formed at that portion of the target seal region 440. The control circuit 148 can compare that parameter to one or more criteria, such as to a threshold value, such as to indicate the strength of the seal on the first side 442 of the target seal region 440 meets the one or more criteria to be deemed sufficient.

After the first side of the target seal region 440 is tested, the second side 444 of the target seal region 440 can be tested, such as shown in FIG. 4C. Here, the second portion 416 of the first electrode 412 can be set to a polarity opposite that of the third portion 424 of the second electrode 422. The first portion 414 of the first electrode 412 (capable of being electrically isolated from and independently actuated from the second portion 416) and the fourth portion 426 (capable of being electrically isolated from and independently actuated from the third portion 424) of the second electrode 422 can be grounded or configured to act as a floating output, while the opposing electrode portions 416, 424 can be used to test a tissue characteristic on a second side of the target seal portion 440. In this case, current can be run from the fourth portion 424 of the second electrode 422, through the second side 444 of the target seal region 440 to the second portion 416 of the first electrode 412, excluding the first portion 414 of the first electrode 412 and the third portion 424 of the second electrode 422. Thus, the second portion 416 of the first electrode 412 can act as a sensor electrode, detecting impedance, resistance, or other electrical parameter of the current or power coming across the seal. In forceps 400, sealing and/or measurement can additionally or alternatively be performed diagonally between the third portion 424 and the second portion 416, or between the fourth portion 426 and the first portion 414. A control circuit, such as control circuit 148 of system 100, can compare that sensed signal to a threshold value to indicate the strength of the target seal region 440 on the first side 442.

This evaluation of sensed data can occur during the sealing process, or after the attempted seal has been completed, such as in a separate post-sealing energy application testing phase. Examples of processes of determining whether additional sealing energy is needed are discussed below in reference to FIGS. 12-18.

Figure 5:
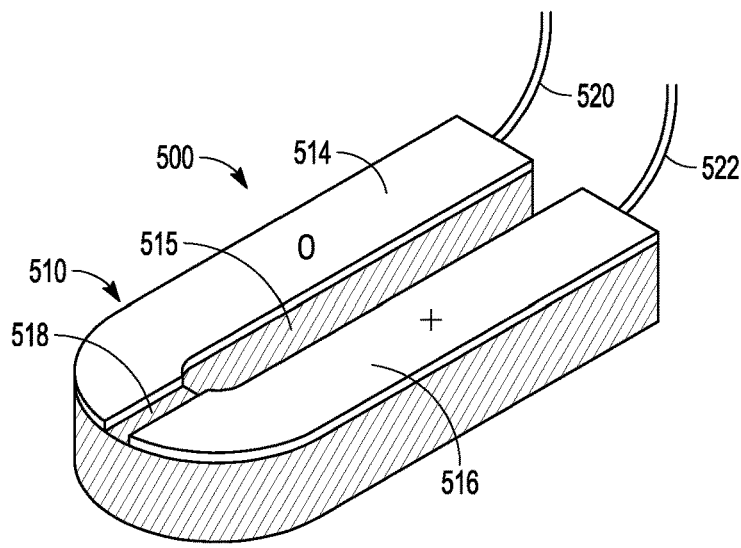
FIG. 5 illustrates a perspective view of an electrode configuration in an example.

FIGS. 5-11 illustrate various examples of sensor electrode configurations such as can be used for testing two sides of a seal made in a target seal region with a forceps such as forceps 300 or 400. FIG. 5 illustrates a perspective view of an example of a first jaw 500. The electrode 510 can reside on a jaw 500 and can contain at least two independently addressable electrode portions 514 and 516, such as can be separated by a blade slot 515 and a longitudinally aligned separator zone 518. In some cases, the blade slot 515 can run along the length of the jaw 500 such as up to the distal end of the jaw 500. In this case the blade slot 515 can include a blade, and the blade slot 515 and the blade can replace the longitudinally aligned separator 518. The electrode 510 can be electrically connected to an external generator (not shown) such as by wires 520 and 522.

The electrode portions 514 and 516 can include respective plates for application of electrical current to a target tissue area. The electrode portions 514 and 516 can be laterally separated from each other by the slot 515 and the longitudinally aligned separator zone 518, such that they are capable of being independently addressable or electrically isolated from each other. The electrode portions 514 and 516 can be selectively and independently addressable for providing electrical current to a target tissue area. In FIG. 5, the electrode portions 514, 516, can also extend from the proximal end to the distal end of the jaw 500, the blade slot 515. The electrode portions 514 and 516 can also be independently addressable for allowing localized individualized testing of each side of an attempted seal created with the electrode 510.

Figure 6:
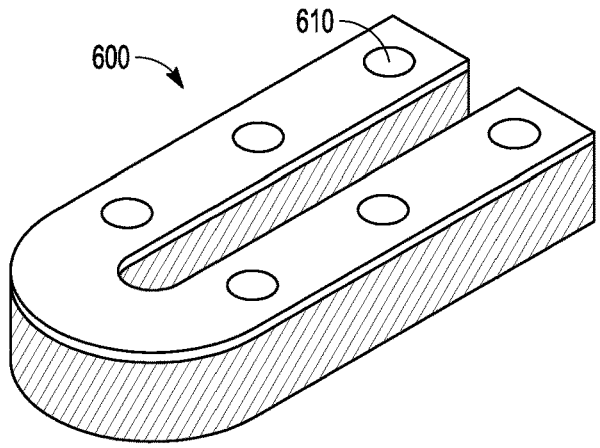
FIG. 6 illustrates a perspective view of an electrode configuration having multiple sensor electrodes in an example.

FIG. 6 illustrates a perspective view of a forceps jaw 600 configuration having multiple sensor electrodes 610. Here, the sensor electrodes 610 can be electrodes, or additional or alternative sensor electrodes next to or integrated with one or more electrodes on the jaw 600. For example, the sensor electrodes can be standoffs electrically isolated from one or more main electrode plates used during application of a seal.

Figure 7:
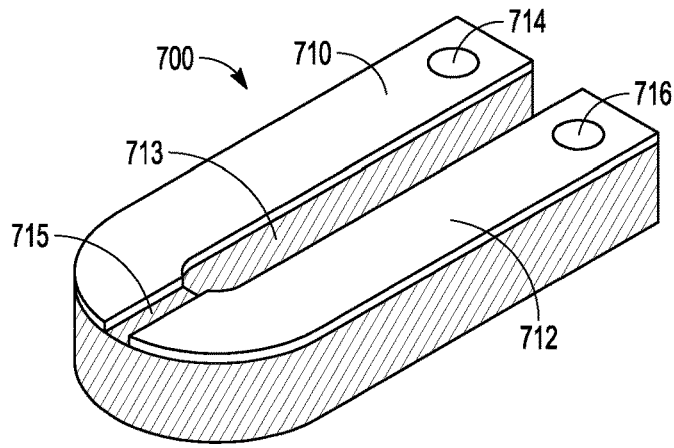
FIG. 7 illustrates a perspective view of an electrode configuration having separate electrodes as sensor electrodes in an example.

FIG. 7 illustrates a perspective view of an electrode configuration on a jaw 700 having two separate electrodes 710, 712, also for use as sensor electrodes. The two electrodes 710, 712, can be separated by a gap 713 and distal longitudinal recess 715 between the electrodes 710 and 712. Where the electrodes 710, 712 are used as the electrodes for sealing the target tissue. Jaw 700 can optionally include isolated sensing electrode 714, 716, which are electrically isolated from the electrodes 710, 712. The sensing electrodes 710, 712, can be used for sensing the integrity of the seal, a recurring, pulsatile, or continuous cycle of sealing and testing can be done, such as described below with reference to FIGS. 12-18.

Figure 8:
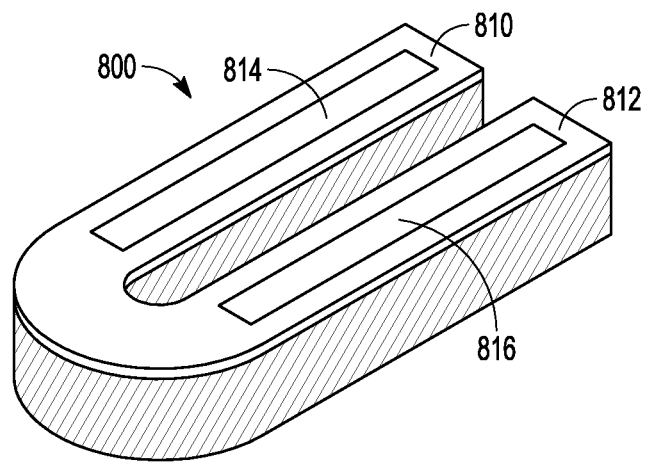
FIG. 8 illustrates a perspective view of an electrode configuration with two sensor electrodes on the plate in an example.

FIG. 8 illustrates an example of a perspective view of a jaw 800 with an electrode configuration having two sensor electrodes 814, 816 mounted on electrode plates 810, 812. Here, the electrode plates 810, 812, can act as the electrodes for sealing and cutting target tissue on the jaw 800. The sensor electrodes 814, 815, can be separate from but mounted on the electrodes 810, 812, the sensor electrodes 814, 815, for sensing an electrical parameter and determining the seal integrity on one or more sides of the seal, or opposing sides of the blade slot. The sensor electrodes 814, 816, can be mounted within the plate boundaries, such as centrally on the plates, or off to one side or the other, depending on the type of seal being made and the location of that seal for testing. Sensor electrodes 814, 816, can delivery sensing pulses when testing of a seal is desired, separate from the electrical energy provided to create the seal by coagulation.

Figure 9:
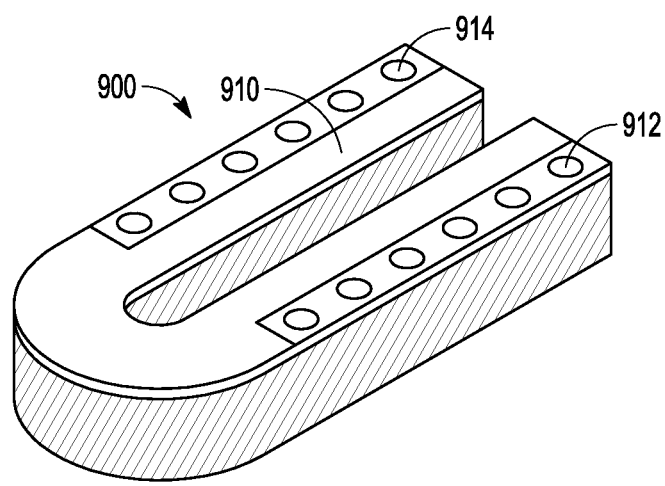
FIG. 9 illustrates a perspective view of an electrode configuration with sensor electrodes outside of the main plate in an example.

FIG. 9 illustrates a perspective view of a jaw 900 with an electrode configuration having sensor electrodes 912, 914 outside of the main electrode plate 910. The sensor electrodes 912, 914, can be mounted on outer edges of the jaw 900, or on inner edges of the jaw 900, or a combination thereof. The sensor electrodes 912, 914, can be separated actuated from the plate 910. For example, the plate 910 can be actuated to seal a vessel, while the sensor electrodes 912, 914, can be actuated during a testing mode, such as to send out one or more pulses for tracking of one or more electrical parameters correlated to the seal integrity. This can allow for testing of edges of a seal made by the plate. In jaw 900, the sensor electrodes 912, 914, can be situated on or near a lateral edge of the haw, such as closed to the lateral edge than to the blade slot. In some cases, the sensor electrodes 912, 914, can instead be situated on or near a blade slot, such as located closer to the slot than to the lateral edge.

Figure 10:
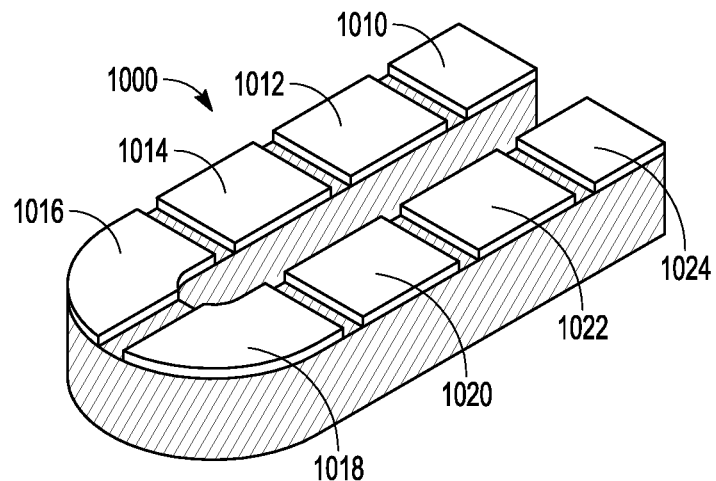
FIG. 10 illustrates a perspective view of an electrode configuration with multiple electrodes in an example.

FIG. 10 illustrates a perspective view of a jaw 1000 having an electrode configuration with multiple electrodes 1010, 1012, 1014, 1016, 1018, 1020, 1022, 1024. On jaw 10000, the electrodes are spaced apart from each other and electrically isolated. The electrodes 1010, 1012, 1014, 1016, 1018, 1020, 1022, 1024, situated around the jaw 1000, can act both as the sealing electrodes and tissue characteristic sensing electrodes.

For example, the electrodes 1010, 1012, 1014, 1016, 1018, 1020, 1022, 1024 can be plates for bipolar vessel sealing. The electrodes 1010, 1012, 1014, 1016, 1018, 1020, 1022, 1024 can be individually actuatable for sealing a vessel, and for testing a seal created on the vessel. In some cases, some of the electrodes can be configured for sealing, and others as sensor electrodes for testing the seal. The large number of electrodes can allow for more localized testing of portions of a seal.

Figure 11:
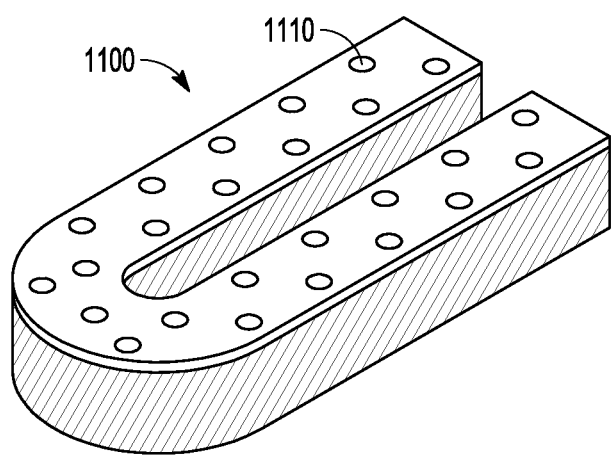
FIG. 11 illustrates a perspective view of an electrode configuration with a sensor electrode array.

FIG. 11 illustrates a perspective view of a jaw 1100 with an electrode configuration including a sensor electrode array 1110. The array 1110 can include isolated sensor electrodes, such as standoff sensor electrodes separate from an electrode plate used for sealing. The array 1110 can be spread evenly across the surface of such a plate on the jaw 1100. The array 1110 can allow for sensing of various portions of a seal across the length and width of the jaw 1100. Each sensor electrode in the array 1110 can be individually articulated to allow a full picture of the surface of a seal across the area of the jaw 1100 and provide detailed information of such a seal.

Figure 12:
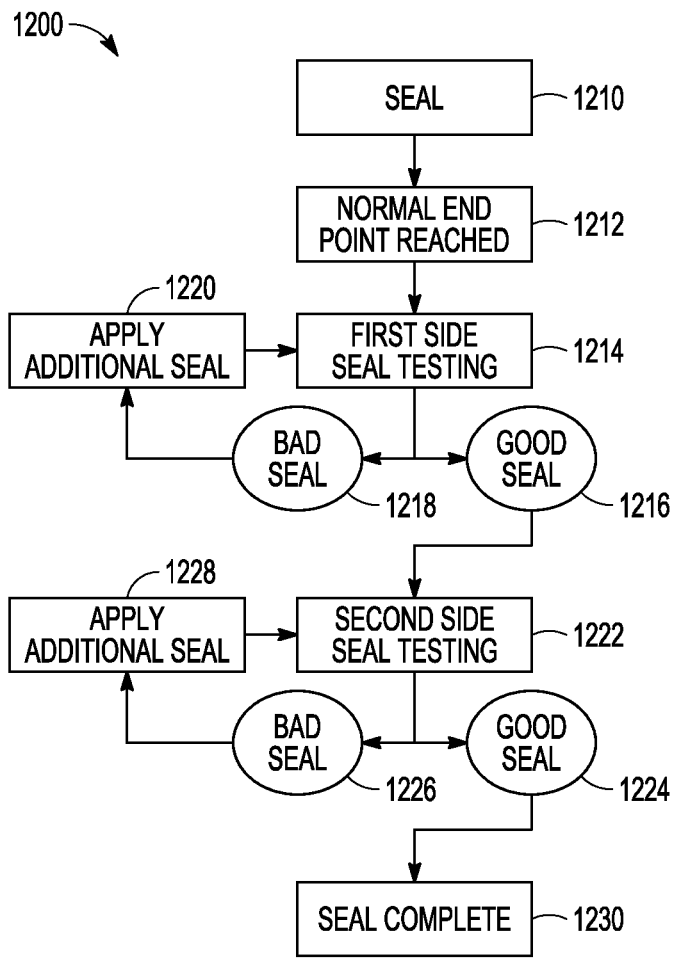
FIG. 12 illustrates a flow chart depicting a method of testing a sealed vessel in an example.

FIG. 12 illustrates a flow chart depicting a method 1200 of testing a sealed vessel in an example. The method 1200 can evaluate sensor electrode signals compared to one or more known values. First, in step 1210, the seal is created on target tissue, such a vessel, such as with a bipolar forceps having any of the electrode configurations discussed above, until a normal end point for such a seal is reached (step 1212).

Then, the first (left) side of the seal can be tested in step 1214. A parameter, such as impedance, of the first side of the seal or cut slot can be collected by the sensor electrodes and evaluated as discussed above with reference to forceps 300, and 400 above. The value of the parameter, such as impedance, can be compared to a known parameter (e.g., impedance, resistance, phase angle, or others) value. In some cases, the values sensed on either side of the seal can be compared to a known value, such as a threshold value. In some cases, the signals from either side of the seal can be compared to each other to determine whether an anomaly exists between the two sides of the seal.

If the value of the parameter taken by the sensor electrodes satisfies a seal quality criteria, the system can indicate that the first side of the seal is "good" or complete, (1216) and continue to test the second (right) side of the seal (step 1222). In some cases, a side of the seal can be re-tested as desired.

Alternatively, if the parameter is not sufficient, the system can indicate that the first side of the seal is "bad" or incomplete (step 1218). In this case, additional sealing can be applied to the first side (step 1220). The first side of the seal can then be re-tested (step 1214). This can be repeated as desired.

When the seal is tested as "good," the second (right) side of the seal can be similarly tested (step 1222). The second side of the seal can be indicated as good (step 1224) or bad (step 1226). If the second side seal is bad (step 1226), a reseal can be applied (step 1228) and then re-tested (step 1222). This can be repeated as desired.

Where the second side seal is good (step 1224), the system can indicate that the seal is completed (step 1230) and the operator can move forward with the procedure, such as continuing to a cutting step. In some cases, the left and right sides of the seal can be concurrently tested, or tested in the opposite order.

Figure 13:
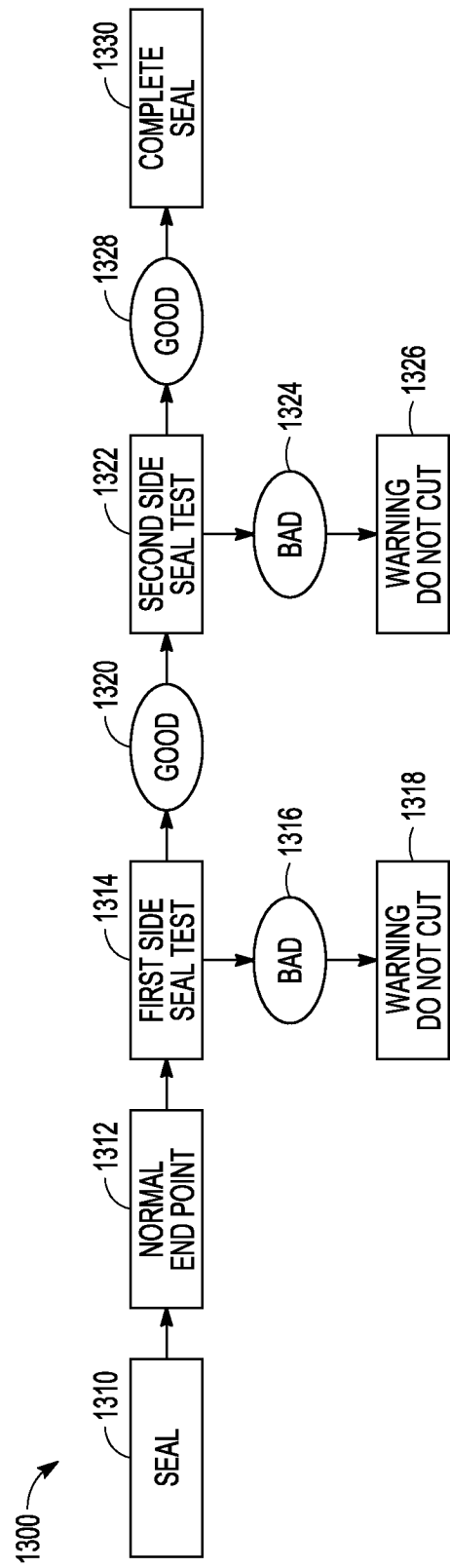
FIG. 13 illustrates a flow chart depicting a method of testing a sealed vessel in an example.

FIG. 13 illustrates a flow chart depicting a method 1300 of testing a sealed vessel in an example. Method 1300 can allow for the operator to choose whether to move forward with a procedure, based on testing of the seal, manually.

In method 1300, a seal can be made in step 1310 on target tissue, such a vessel, such as with a bipolar forceps having any of the electrode configurations discussed above. The seal can be made until a normal end point for sealing is reached in step 1312.

In method 1300, the first side and the second side of the seal can be tested in either order, or in some cases concurrently. The first side of the seal can be tested in step 1314. If the first side of the seal is bad (step 1316), a warning can be indicated to the operator in step 1318, such as by a user interface, text, light, audible noise, or other indicator. Alternatively, if the first side of the seal is good (step 1320), testing of the second side can begin.

The operator can then determine when to proceed to the next step of testing the second side of the seal (step 1322). Similarly, if the second side is indicated to be bad (step 1324), the system can indicate this to the operator (step 1326). Conversely, if the second side of the seal is good (step 1328), an indication of a complete seal can be given to the operator (step 1330).

Figure 14:
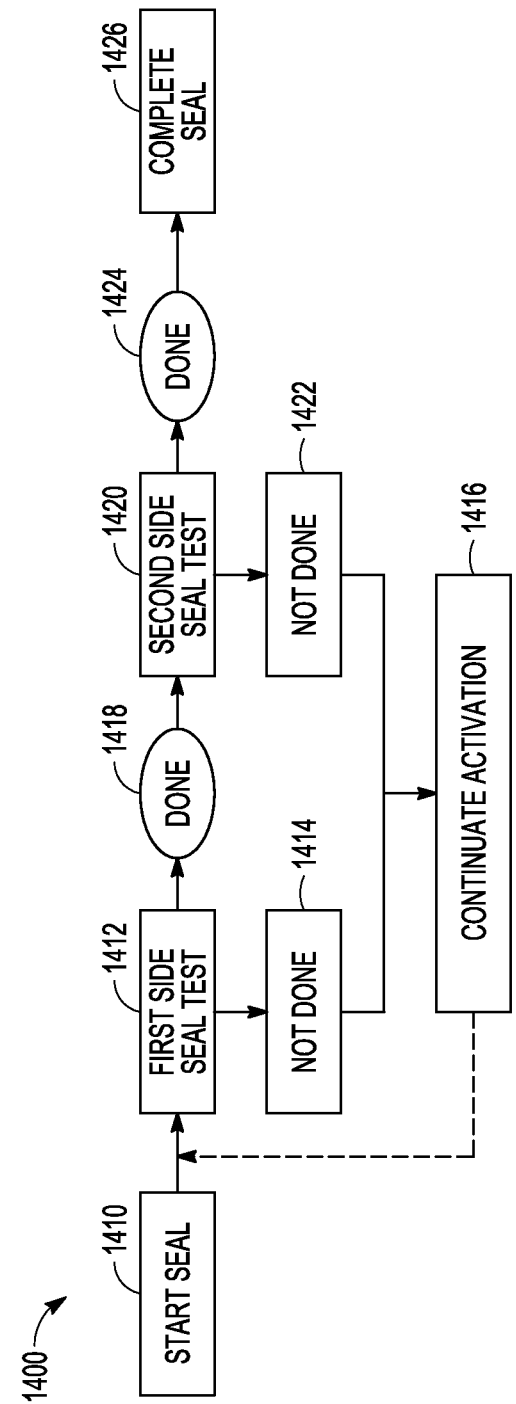
FIG. 14 illustrates a flow chart depicting a method of testing a sealed vessel in an example.

FIG. 14 illustrates a flow chart depicting a method 1400 of testing a sealed vessel in an example. Method 1400 can include a method of testing a seal during activation of that seal.

First, in step 1410, a seal can be started on target tissue, such a vessel, such as with a bipolar forceps having any of the electrode configurations discussed above. In method 1400, the first side and the second side of the seal can be tested in either order, or in some cases, concurrently.

In an example, the first side of the seal can be tested (step 1412) as discussed earlier, such as by sensing of an electrical parameter of the first side of the seal, and comparing that sensed parameter to a known or threshold parameter value to determine whether the first side of the seal is complete. If the first side of the seal is not complete (step 1414), activation of the seal can be continued in step 1416. As activation is continued, the first side can be re-tested in step 1412.

Once the first side of the seal is deemed complete (step 1418), the second side of the seal can be tested (step 1420). The second side of the seal can be tested in a manner similar to that of the first side. If the second side of the seal is deemed incomplete (step 1422), activation of the seal can continue (step 1416), and testing can resume (steps 1412, 1420) until both sides of the seal are deemed complete (step 1424). The system can then indicate to the user that the seal is complete (step 1426).

In this way, sensing of either side of a seal can be done while the seal is being applied. Similarly, the devices discussed herein can be configured to reduce the pressure on the sealed side and increase the pressure on unsealed side if independently activating each side of a seal during application.

Figure 15:
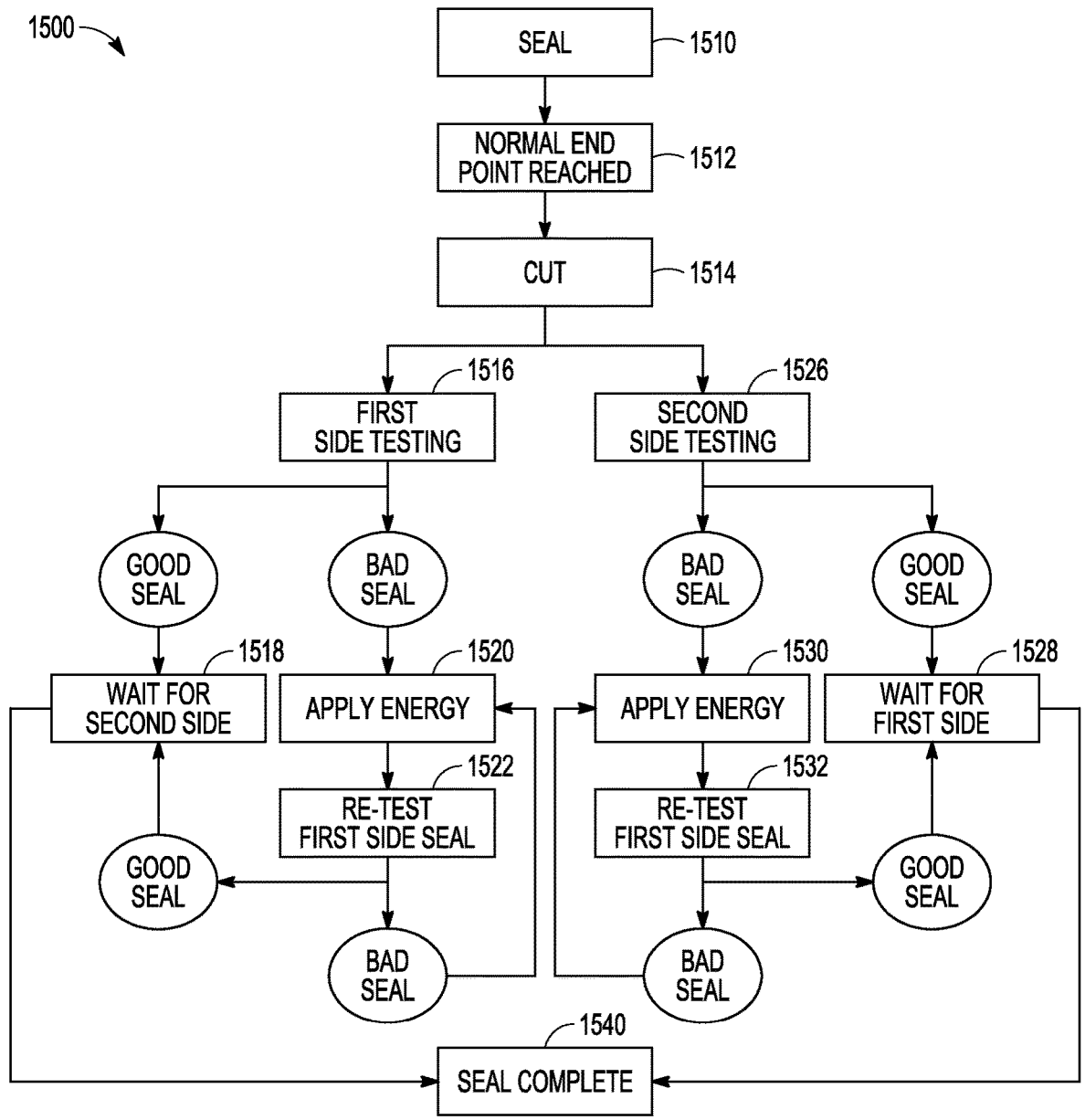
FIG. 15 illustrates a flow chart depicting a method of testing a sealed vessel in an example.

FIG. 15 illustrates a flow chart depicting a method 1500 of testing a sealed vessel in an example using two sealing systems, such as shown in FIGS. 4A-4C above. In method 1500, activation of a sealing waveform (step 1510) can be done simultaneously across both sections of the device to create a seal on a vessel, until a normal sealing endpoint is reached (step 1512). Then, the vessel can be cut (step 1514) between the two sets of electrode portions.

Simultaneously, each side of the cut seal can be tested. On the first side, the opposing electrode portions on the first side (or additional sensor electrodes) can be used to test the first side seal for a specified electrical parameter in step 1516. If, based on the produced electrical parameter, the first side seal is considered "good," the first side testing can wait for a signal from the second side testing to proceed (step 1518). In some cases, the second side seal testing, additional sealing, and re-testing can be executed subsequent to testing of the first side.

If, however, based on the produced electrical parameter, the first side seal is considered "bad" or incomplete, an additional energy set can be applied to the first side seal to re-seal that side (step 1520). For example, activation of a seal can be done on just the first side to re-seal or fix the seal as needed. After the re-sealing, the first side seal can be re-tested (step 1522). If the seal is "good," the first side testing can wait for a signal from the second side testing to proceed (step 1518). If, however, the first side seal is still "bad," re-sealing and re-testing can be repeated as needed until a good first side seal is achieved.

At the same time, the second side seal can be tested in step 1526. Similar to the other side, the second side seal can be tested for one or more electrical parameters, with the electrodes acting as sensor electrodes, or with additional sensor electrodes. If the second side seal is "good," the second side can wait for a signal from the first side testing to proceed (step 1528). If, however, the second side seal is "bad" or incomplete, an additional energy set can be applied to the second side seal to re-seal that side (step 1530). After the re-sealing, the second side seal can be re-tested (step 1532). If the seal is "good,"," the second side testing can wait for a signal from the first side testing to proceed (step 1528). If, however, the first side seal is still "bad," re-sealing and re-testing can be repeated as needed until a good second side seal is achieved.

Once both the first side and the second side indicate that the seal is good, the system can indicate to the user that the seal and cut as a whole are complete (step 1540).

Figure 16:
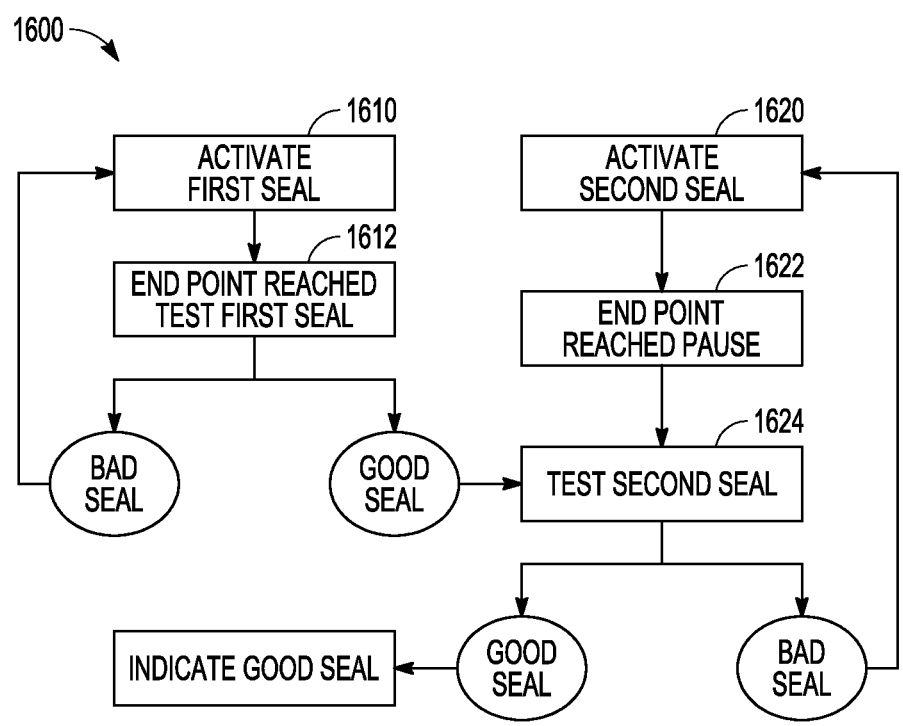
FIG. 16 illustrates a flow chart depicting a method of testing a sealed vessel in an example.

FIG. 16 illustrates a flow chart depicting a method 1600 of testing a sealed vessel in an example with two sealing systems. In this case, activation of two separate seals can be initiated in step 1610 and 1620.

In step 1610, a first seal can be activated and energy can be applied to the target tissue to coagulate that tissue and create a seal up until a normal endpoint is reached in step 1612. Then, the first seal can be tested, such as by using a sensor electrode to monitor and record one or more electrical properties of the sealed target tissue, such as impedance, resistance, phase angle, or other parameters. Based on the detected electrical parameter, the system can determine whether the seal is "good" or "bad". If the seal is "bad," the system can prompt for continued activation or re-sealing of the first seal, followed by additional testing of that first seal. If the first seal is "good," the system can indicate that the second seal can be tested.

In step 1620, which can be simultaneous to step 1610, the second seal can be activated and energy can be applied to the target tissue to coagulate that tissue and create a seal up until a normal endpoint is reached in step 1622. Then, the system can pause function with regards to the second seal until a signal is received indicating that the first seal is "good." At this point, the second seal can be tested in step 1624. If the second seal is "bad," the system can prompt for continued activation or re-sealing of the second seal, followed by additional testing of that second seal. If the seal is "good," the system can indicate that both the first and second seals are complete and the operator may continue with the procedure. This process can be done incrementally, applying additional sealing energy and re-testing until the tissue parameter meets a target value.

Figure 17:
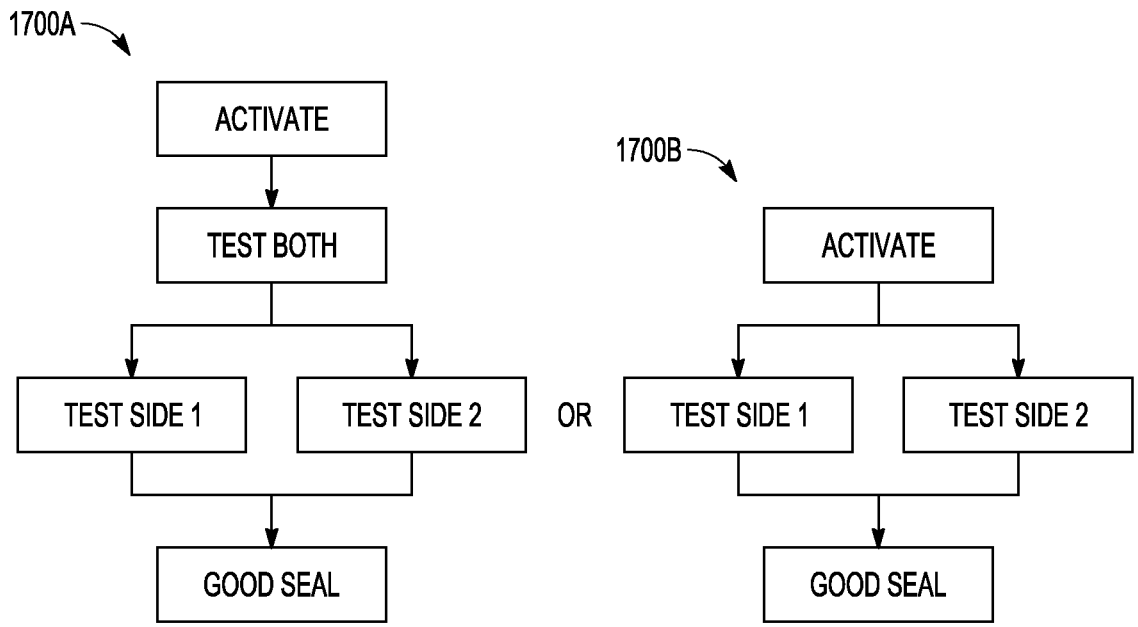
FIG. 17 illustrates a flow chart depicting a method of testing a sealed vessel in an example.

FIG. 17 illustrates a flow charts depicting a method 1700A and 1700B of testing a sealed vessel in an example. In method 1700A, a sealing phase can be activated (step 1702), both sides of the seal (or seals on either side of a blade slot) can be tested (step 1704), and then each side of the seal can be individually tested (step 1706), resulting in a good seal (step 1708). In method 1700B, a sealing phase can be activated (step 1710), each side can be tested individually (step 1712), resulting in a good seal (step 1714). The systems discussed herein can be used to simultaneously, alternatively, or repetitively, test sides of seals as desired, depending on the requirements for a given operation. The testing can be done during, after, or in-between sealing phases, before or after cutting, and more than once as desired.

Figure 18:
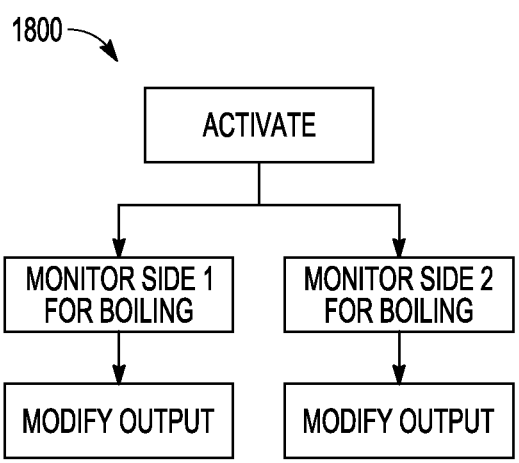
FIG. 18 illustrates a flow chart depicting a method of testing a sealed vessel in an example.

FIG. 18 illustrates a flow chart depicting a method 1800 of testing a sealed vessel in an example with an atypical pulsed waveform. In method 1800, a sealing phase can be activated in step 1810.

Once activation has occurred, the first side can be monitored in step 1812 simultaneously with the second side in step 1814. For example, one or more sensor electrodes can be used to monitor one or more electrical parameters on either the first side or the second side of the seal being applied. Depending on the sensed parameters, the first or second side seals can be modified as desired in step 1816 and 1818, respectively.

Various Notes & Examples

Example 1 can include a forceps system for sealing a vessel, the forceps system comprising a forceps including first jaw and an opposing second jaw, wherein at least one of the first and second jaws includes at least a first electrode having first and second electrode portions that are laterally separated to permit electrical isolation between the first and second electrode portions, and wherein the first and second electrode portions are independently addressable to permit individual testing by the first and second electrodes portions of a vessel characteristic.

Example 2 can include Example 1, comprising a slot between at least a portion of the laterally separated first and second electrode portions.

Example 3 can include any of Examples 1-2, further comprising a retractable blade extendable in the slot between the first electrode portion and the second electrode portion.

Example 4 can include any of Examples 1-3, wherein the first electrode portion and the second electrode portion are laterally separated by the slot.

Example 5 can include any of Examples 1-4, wherein the first electrode portion and the second electrode portion each extend from between a distal portion and a proximal portion of the first jaw.

Example 6 can include any of Examples 1-5, wherein the other of the first and second jaws includes a second electrode.

Example 7 can include any of Examples 1-6, wherein the first and second electrodes comprise a first plate electrode and a second plate electrode.

Example 8 can include any of Examples 1-7, wherein the first electrode and the second electrodes are situated on or near a lateral edge of at least one of the first and second jaws.

Example 9 can include any of Examples 1-8, wherein the first electrode and second electrode are situated on or near a slot of at least one of the first and second jaws.

Example 10 can include any of Examples 1-9, wherein the second electrode comprises a third electrode portion and a fourth electrode portion, wherein the third and fourth electrode portions are laterally separated to permit electrical isolation between the third and fourth electrode portions.

Example 11 can include any of Examples 1-10, wherein the third and fourth electrode portions are independently addressable to permit individual testing by the third and fourth electrodes portions of a vessel characteristic.

Example 12 can include any of Examples 1-11, further comprising one or more sensor electrodes electrically isolated from the first electrode.

Example 13 can include any of Examples 1-12, wherein the one or more sensor electrodes comprise standoffs on at least one of the first and second jaws.

Example 14 can include a method for testing a seal of a vessel, the method comprising locating individually addressable first and second electrode portions on opposing sides of a target seal region, individually testing a first tissue parameter of a first side of the target seal region using the first electrode portion, and individually testing a second tissue parameter of a second side of the target seal region using the second electrode portion.

Example 15 can include Example 14, further comprising cutting the target seal region of the vessel using a blade locatable between the first and second electrode portions after individually testing the first and second tissue parameters.

Example 16 can include any of Examples 14-15, further comprising at least partially sealing the target seal region with a forceps having the first and second electrode portions before testing the first and second tissue parameters.

Example 17 can include any of Examples 14-16, wherein individually testing a first tissue parameter of a first side of the target seal region of the vessel using the first electrode portion and individually testing a second tissue parameter of a second side of the target seal region of the vessel using the second electrode portion are performed while applying sealing energy to the target seal region of the vessel.

Example 18 can include any of Examples 14-17, further comprising selectively applying at least partially re-sealing energy at least one of the first side or the second side of the target seal region of the vessel based on at least one of the first or second tissue parameters.

Example 19 can include any of Examples 14-18, wherein applying at least partially re-sealing energy comprises incrementally applying additional sealing energy and re-testing until the tissue parameter meets a target value.

Example 20 can include any of Examples 14-19, wherein individually testing a first tissue parameter of a first side of the target seal region of the vessel using the first electrode portion and individually testing a second tissue parameter of a second side of the target seal region of the vessel using the second electrode portion are performed concurrently.

Example 21 can include a method for testing a seal of a vessel, the method comprising locating individually addressable first and second electrode portions on respective sub-regions of a target seal region, individually iteratively sealing and testing a first tissue parameter of the first subregion using the first electrode portion until at least one first criteria is met, and individually iteratively sealing and testing a second tissue parameter of the second subregion using the second electrode portion until at least one second criteria is met.

Example 22 can include Example 21, wherein at least one of the first or second criteria are representative of a completeness of a seal of a corresponding one of the respective first and second subregions.

Each of these non-limiting examples can stand on its own or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37

C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A forceps system for sealing a vessel, the forceps system comprising:
    a forceps including a first jaw and a second jaw opposing the first jaw,
    the first jaw including a first electrode, a second electrode, and a slot between at least a portion of the first electrode and at least a portion of the second electrode,
    the second jaw including a third electrode located opposing the first electrode and a fourth electrode located opposing the second electrode; and
    circuitry configured to:
    direct a first current between the first electrode and the third electrode to form a first side of a seal region of the vessel;
    direct a second current between the second electrode and the fourth electrode to form a second side of the seal region, the seal region extending between the first side of the seal region and the second side of the seal region;
    after the first current and the second current have been directed, direct a third current between the first electrode and the third electrode and between the second electrode and the third electrode to electrically test the first side of the seal region; and
    after the first current and the second current have been directed, direct a fourth current between the first electrode and the fourth electrode and between the second electrode and the fourth electrode to electrically test the second side of the seal region.

2. The forceps system of claim 1, further comprising a retractable blade extendable in the slot between the first electrode and the second electrode.

3. The forceps system of claim 1, wherein the first electrode and the second electrode each extend between a distal portion of the first jaw and a proximal portion of the first jaw.

4. The forceps system of claim 1, wherein the first electrode comprises a first plate electrode and the second electrode comprises a second plate electrode.

5. The forceps system of claim 1, wherein the first electrode is situated on or near a lateral edge of the first jaw.

6. The forceps system of claim 1, wherein the first electrode is situated on or near the slot.

7. The forceps system of claim 1, further comprising one or more sensor electrodes electrically isolated from the first electrode.

8. The forceps system of claim 7, wherein the one or more sensor electrodes comprise standoffs on at least one of the first jaw or the second jaw.

9. The forceps system of claim 1, wherein while the fourth current is directed, the third electrode is grounded or operates a floating output.

10. The forceps system of claim 1, wherein the circuitry is disposed on the forceps toward a distal portion of the forceps.

11. The forceps system of claim 1, wherein the circuitry is configured to electrically test the first side of the seal region on the vessel by, in response to the third current, determining at least one of an impedance of the first side of the seal region, a resistance of the first side of the seal region, or a phase angle imparted by the first side of the seal region.

12. The forceps system of claim 1, wherein:
    the slot extends in a longitudinal direction; and
    the first jaw further includes a fifth electrode longitudinally adjacent to the first electrode.

13. The forceps system of claim 1, wherein while the third current is directed, the fourth electrode is grounded or operates a floating output.

14. The forceps system of claim 1, wherein the forceps is configured to retain the vessel between the first jaw and the second jaw, without releasing the vessel from between the first jaw and the second jaw, while the first current, the second current, the third current, and the fourth current are directed.

15. The forceps system of claim 1, wherein:
    the slot extends in a longitudinal direction; and
    the first electrode and the second electrode are laterally adjacent.

16. The forceps system of claim 1, wherein the circuitry is configured to electrically test the second side of the seal region on the vessel by, in response to the fourth current, determining at least one of an impedance of the second side of the seal region, a resistance of the second side of the seal region, or a phase angle imparted by the second side of the seal region.

* * * * *